Feb. 4, 1941.    F. V. HART ET AL    2,230,244
MACHINE FOR OPERATING UPON SHOES
Filed July 28, 1939.    9 Sheets-Sheet 1

INVENTORS
Fred V. Hart and
John J. Austin
By their attorney

Feb. 4, 1941.  F. V. HART ET AL  2,230,244
MACHINE FOR OPERATING UPON SHOES
Filed July 28, 1939  9 Sheets-Sheet 2

INVENTORS

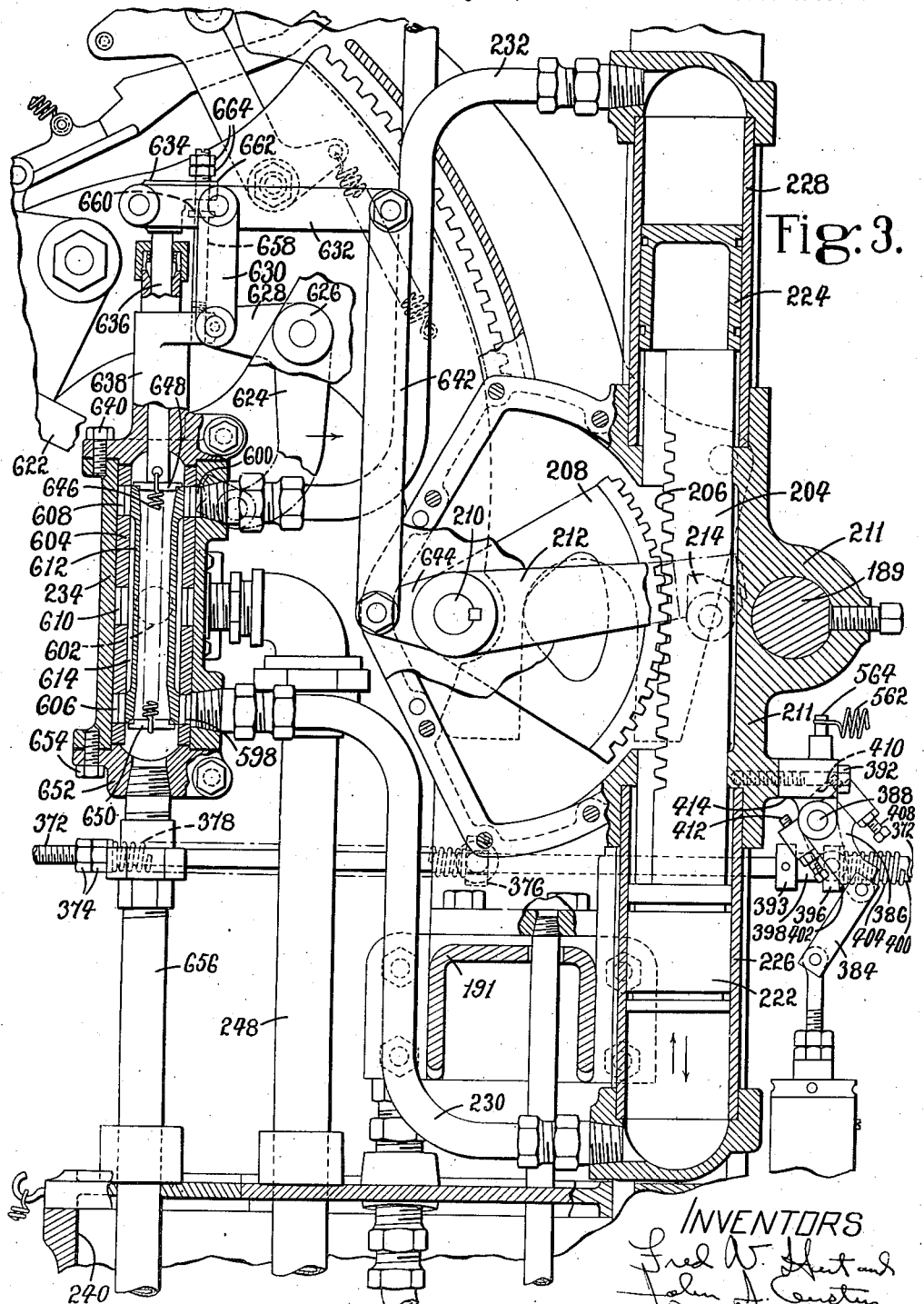

Feb. 4, 1941.   F. V. HART ET AL   2,230,244
MACHINE FOR OPERATING UPON SHOES
Filed July 28, 1939   9 Sheets-Sheet 4
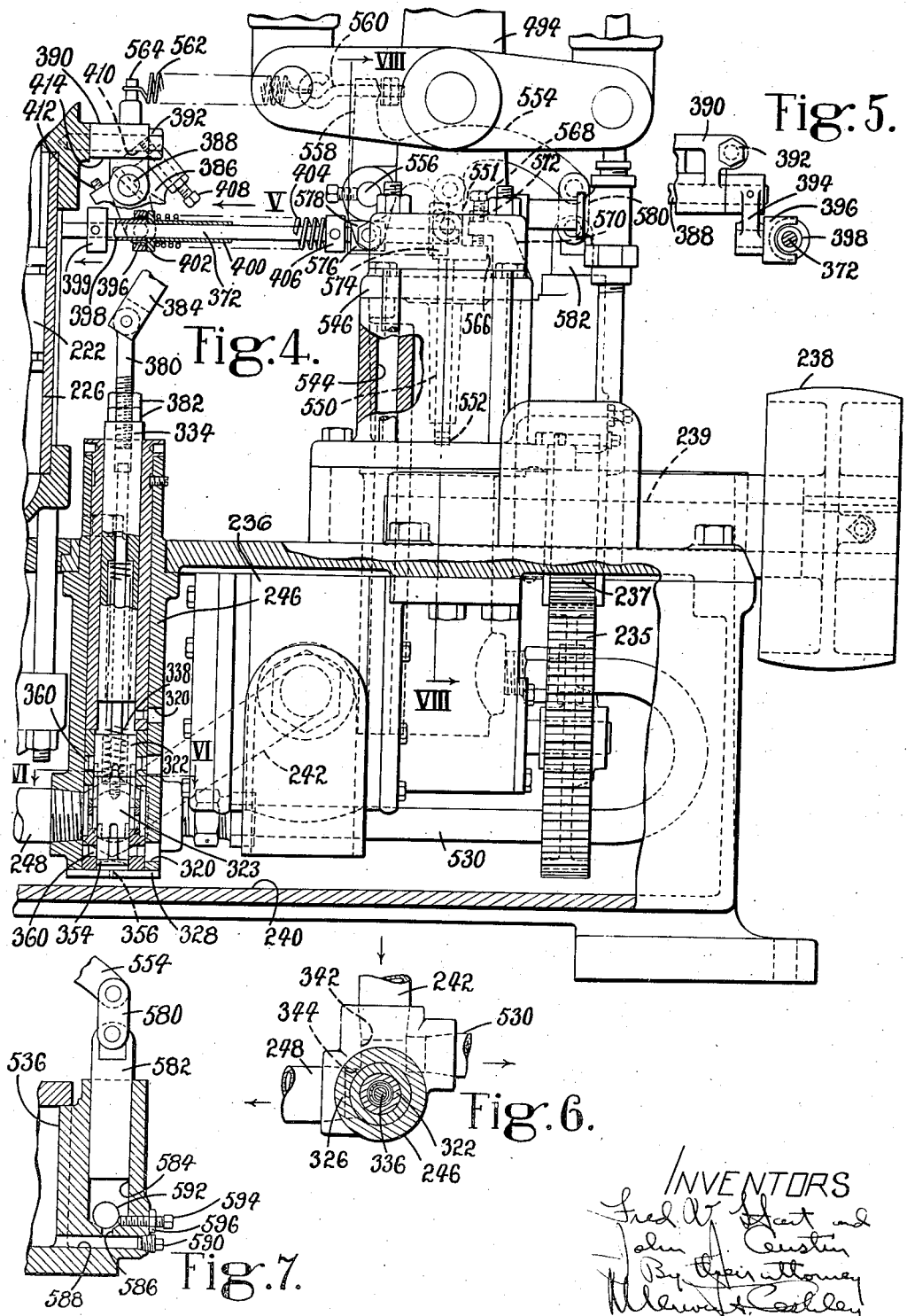
INVENTORS

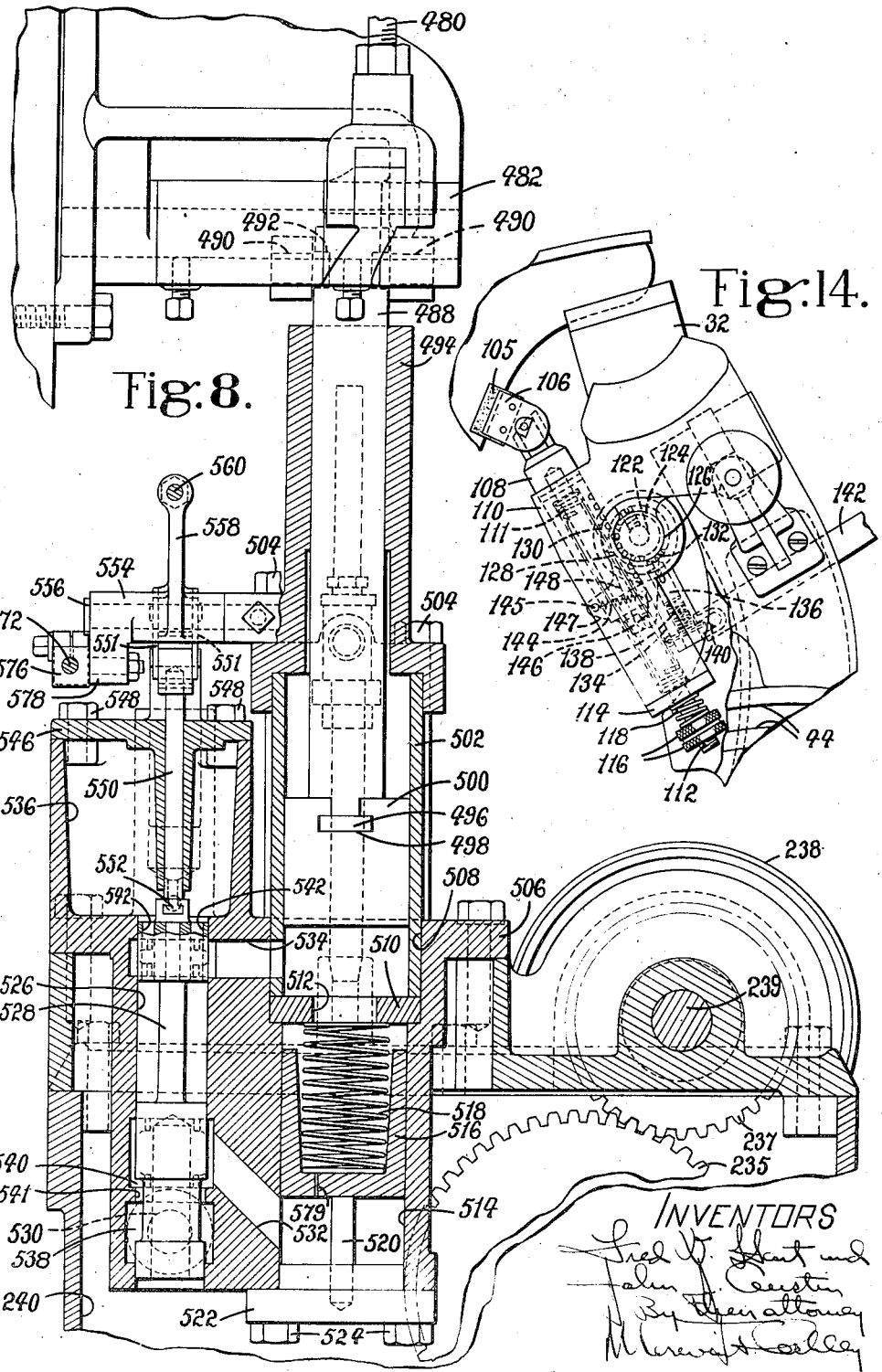

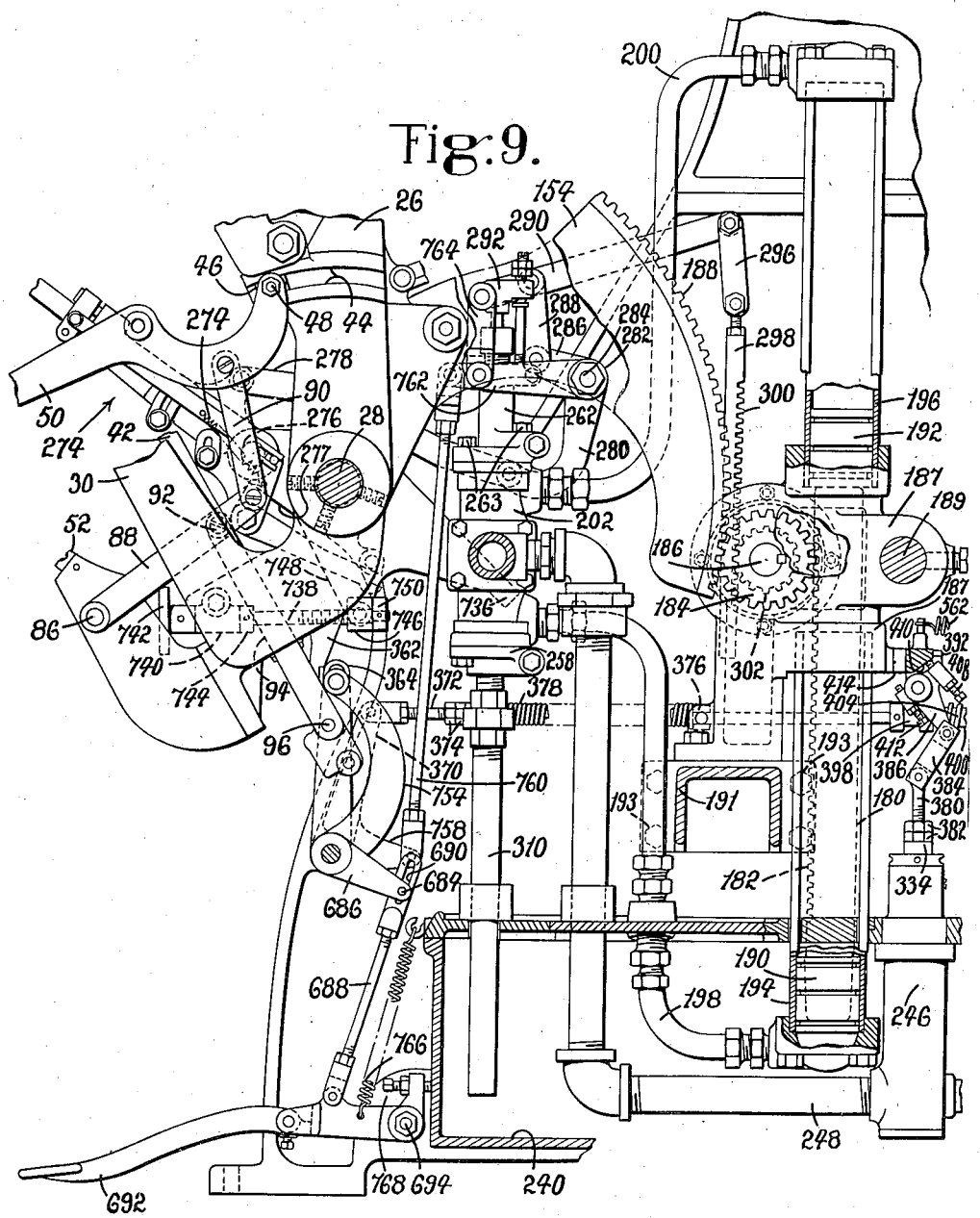

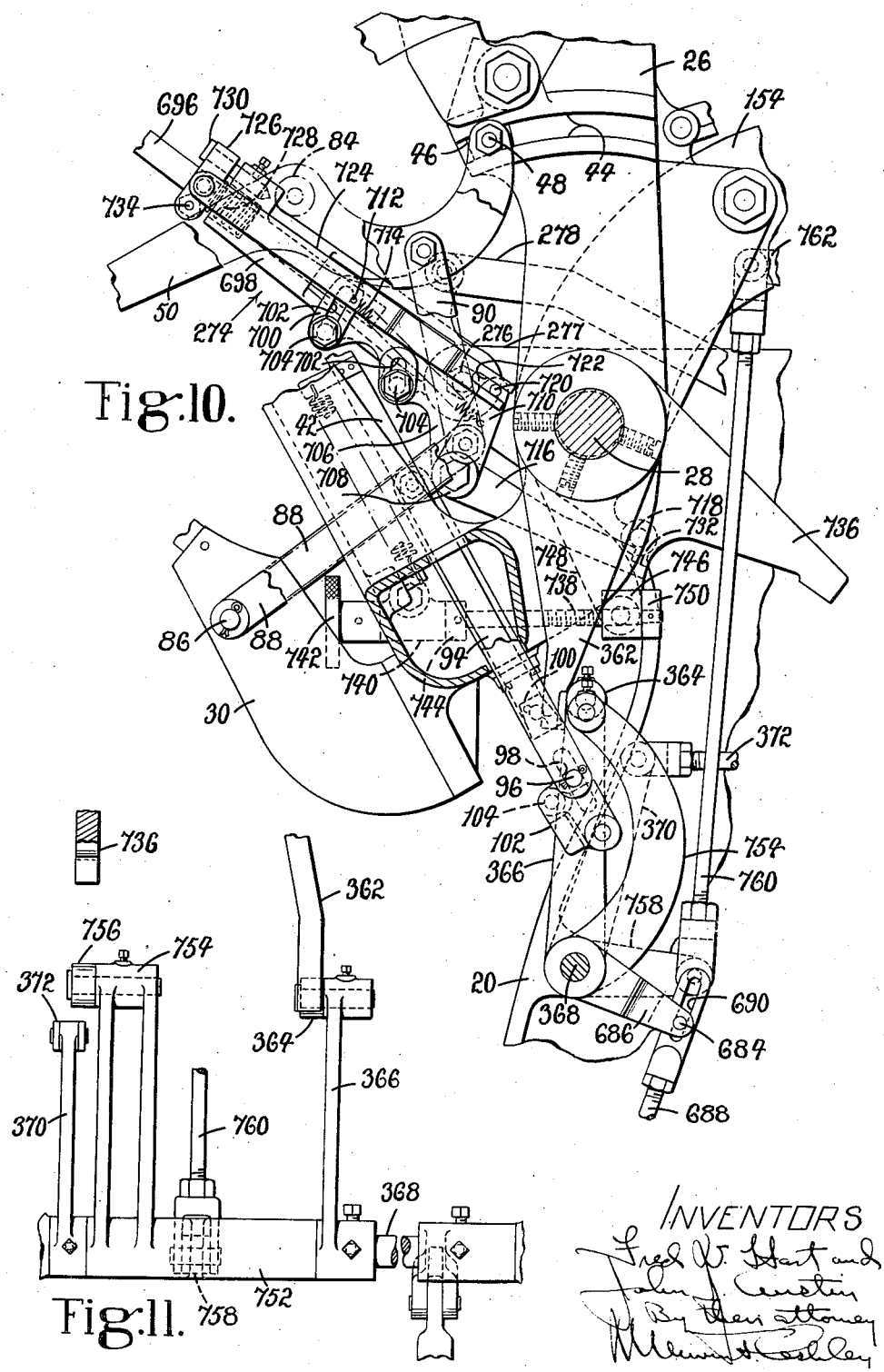

Feb. 4, 1941.  F. V. HART ET AL  2,230,244
MACHINE FOR OPERATING UPON SHOES
Filed July 28, 1939  9 Sheets-Sheet 8

INVENTORS

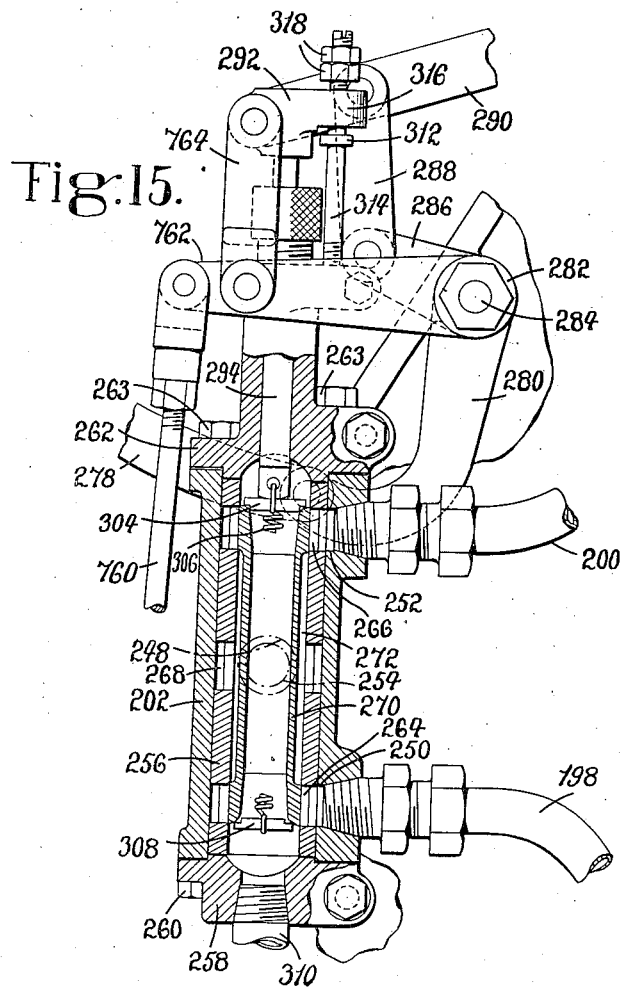

Patented Feb. 4, 1941

2,230,244

UNITED STATES PATENT OFFICE 2,230,244

MACHINE FOR OPERATING UPON SHOES

Fred V. Hart, Lynn, and John J. Austin, Beverly, Mass., assignors to United Shoe Machinery Corporation, Borough of Flemington, N. J., a corporation of New Jersey Application July 28, 1939, Serial No. 287,082

99 Claims. (Cl. 12—34)

This invention relates to machines for operating upon shoes, and more particularly to machines for shaping or leveling the bottoms of shoes. The invention is herein illustrated with reference to that type of machine having a leveling tool, such as a spring-pressed roll, and a shoe support mounted for swinging movements in directions lengthwise of a shoe thereon to cause the leveling tool to operate progressively along the shoe bottom, and in which the movements of the shoe support are effected by power-operated means continuously under the control of the operator. It will be understood, however, that the invention in some of its aspects is not limited to machines of the particular type illustrated.

An object of the invention is to provide in a machine of the above-mentioned type improved means for controlling its power operation, of such character as to afford the operator substantially as full control of the operation of the machine as if he were operating it manually. For the purpose in view, the controlling means, as herein illustrated, comprises a manually-operated member movable to start the power-operated means in operation and adapted to be moved continuously during the operation of the power-operated means, and automatic means cooperating with the manually-operated member to cause the power-operated means to come to a stop when the movement of the manually-operated member is stopped. In the illustrated construction, the manually-operated member comprises a hand lever which is movable in either a rearward or a forward direction to cause rearward or forward swinging movement of the shoe support, and which may be utilized to determine by the speed of its movement in either direction the speed of movement of the shoe support. Thus, the operator is enabled at will to start, stop or reverse the direction of swinging movement of the shoe support and to determine variably by the extent of the movement of the hand lever in either direction the extent of rearward or forward swinging movement of the support. Conveniently and in accordance with still further features of the invention, similar power-operated means is provided for imparting to the leveling tool tipping movements laterally of the shoe about an axis extending lengthwise of the shoe and controlling means enabling the operator at will to start, stop, or reverse the tipping movement of the leveling tool. This controlling means comprises a second hand lever which, by the extent of its movements in rearward and forward directions, determines variably the extent of tipping movements imparted to the leveling tool in opposite directions and which may be utilized to determine by the speed of its movement the speed of tipping movement of the leveling tool. By manipulation of both these hand levers, which for convenience are mounted one at each side of the machine, the operator has as effective control of the movements of the shoe support and leveling tool as if he were operating them manually but without the labor that would be required if one or both of these instrumentalities were operated manually. The invention in its illustrated embodiment provides fluid-pressure means for imparting to the shoe support and leveling tool the above-mentioned movements, but it will be recognized that it is not thus limited, since other means may be utilized for the accomplishment of the objects in view.

As a further feature, the invention provides novel mechanism for automatically imparting to the leveling tool in predetermined time relation to the relative movement of the shoe support and leveling tool a movement heightwise of the shoe into a position higher than it occupies in operating on the shoe and then a movement downwardly into initial engagement with the bottom face of the toe end of the sole, and after the completion of the leveling operation a movement into its elevated position when it is in the same relation to the toe end of the sole. There is accordingly no danger of excessive bending of the margin of the sole by pressure of the leveling tool thereon. The construction herein shown comprises a fluid-operated piston movable by pressure of fluid against it to lift the leveling tool against the resistance of spring means tending normally to press the tool down on the bottom of the shoe, and novel controlling mechanism for releasing the tool to the action of the spring means only after the toe end of the shoe has been carried to a position under the tool in the first rearward movement of the shoe support and for thereafter causing the tool to be lifted when the shoe support in its forward movement arrives in a position in which the tool is in engagement with the toe end of the sole. In order to prevent too sudden a release of the leveling tool to the action of its spring means, such as might tend to cause the tool to impart a hammer blow to the bottom of the shoe, the illustrated machine is further provided with a fluid check for retarding the movement of the tool toward the shoe.

The illustrated machine is further provided with means whereby the leveling tool may be controlled by the operator in such manner as to apply the leveling pressure selectively to one or more portions of the shoe bottom without necessarily applying pressure to other portions. As herein shown, there is provided a valve for controlling the flow of pressure fluid to and from the above-mentioned fluid-operated piston, a member movable in one direction in response to rearward movement of the shoe support to move the valve into position to disconnect the source of pressure fluid from the piston and to permit the spring means to press the tool initially down on the shoe, and movable in the opposite direction in response to forward movement of the shoe support to move the valve into position to cause the tool to be lifted by the action of the pressure fluid on the piston, after the leveling operation; and manually-operated means for controlling the movements of this member independently of the shoe support to permit the operator at will to control the valve in the course of the leveling operation. The construction is further such that the operator may control this valve in such manner as to cause a plurality of hammer blows to be imparted to one or more portions of the shoe bottom by the leveling tool to assist in properly leveling such portions.

In machines of the type herein shown, the shoe support is adjustable to accommodate shoes of different sizes and to position the ends of the toes of the different shoes in substantially the same location; and, in accordance with a further feature of the invention, automatic means is provided for variably limiting the rearward movement of the shoe support in accordance with variations in the lengths of shoes of different sizes, so that the leveling tool will operate on the bottom face of each shoe only substantially as far heelwardly as the junction of its shank and heel end portions, this means being adjustable to vary the extent of rearward movement of the shoe support. In accordance with still another feature of the invention, there is provided novel means for limiting the forward swinging movement of the shoe support to cause it to stop when the leveling tool is in engagement with the bottom face of the toe end of the sole of the shoe, thus permitting this portion of the sole to be properly leveled by tipping the tool.

Various novel features of the invention are further to be recognized in means for increasing the pressure of the operating fluid as the work support is moved to present the work in position to be operated upon. In the illustrated construction, there is provided a valve arranged to be held normally in open position by pressure of fluid delivered by the pump to the fluid-pressure mechanism, valve controlling means for yieldingly resisting such opening of the valve to cause the fluid to be maintained under sufficient pressure between the pump and the fluid pressure mechanism to move the work support, and automatic means for increasing the resistance of the valve controlling means to increase the pressure of the operating fluid at a predetermined time in the movement of the work support prior to the engagement of the tool with the work.

The above and other features of the invention, including various novel details of construction and combinations of parts, will now be more particularly described by reference to the accompanying drawings and pointed out in the claims.

In the drawings:

Fig. 3 is an enlarged view, partly in right-hand side elevation and partly in section, showing the fluid-pressure means for imparting to the leveling tool its tipping movements with its controlling valve mechanism and operating connections;

Fig. 4 is an enlarged view, partly in right-hand side elevation and partly in section, showing a valve for controlling the pressure of the operating fluid and connections therefrom to the pump and a portion of the mechanism for operating the pressure control valve, and also a valve for controlling the flow of pressure fluid to the mechanism for lifting the leveling tool;

Fig. 5 is a detail view looking in the direction of the arrow 5 in Fig. 4;

Fig. 6 is a section on the line VI—VI of Fig. 4;

Fig. 7 is a detail sectional view of a fluid check hereinafter described;

Fig. 8 is a section on the line VIII—VIII of Fig. 4;

Fig. 9 is an enlarged view, partly in right-hand side elevation and partly in section, showing the fluid pressure means for imparting to the shoe support its swinging movements with its controlling valve mechanism and connections for operating the valve manually and also automatically;

Fig. 10 is a view on an enlarged scale of a portion of the mechanism shown in Fig. 9;

Fig. 11 is a detail view in front elevation illustrating the relative positions of certain parts shown in Fig. 10;

Fig. 14 is a view in side elevation of a portion of the mechanism for operating the additional support for the shoe between its toe and heel ends;

Fig. 15 is a view, partly in side elevation and partly in section, of the valve mechanism shown in Fig. 9.

Figure 1:
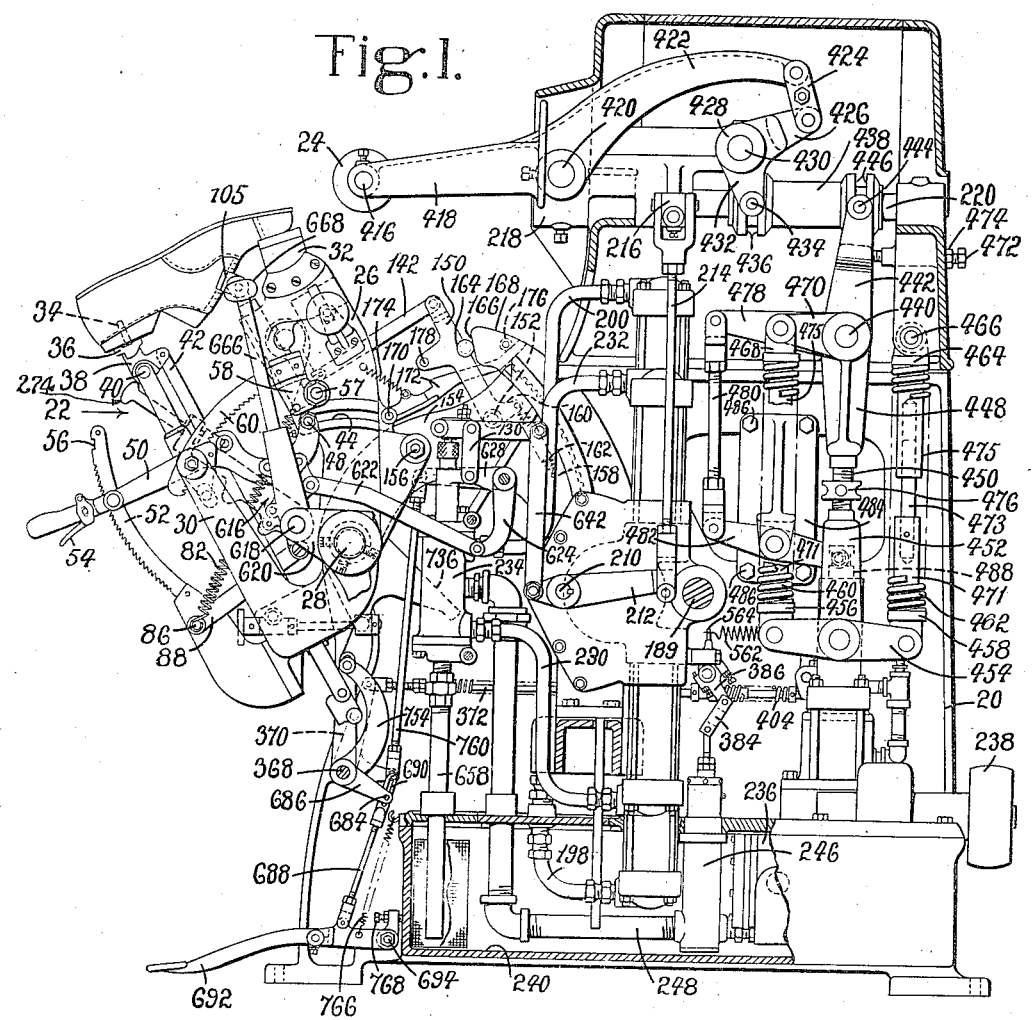
Fig. 1 is a view in right-hand side elevation of a machine in which the invention is embodied, parts of the structure being broken away and other parts being shown in section.

The main frame 20 of the illustrated machine has pivotally connected thereto a shoe support or jack 22 to which swinging movements are imparted by power-operated means under control of the operator, hereinafter described, to carry the shoe rearwardly and forwardly beneath a leveling roll 24 which is yieldingly forced down on the shoe bottom to apply leveling pressure progressively to the sole and to which tipping movements may be imparted by separate power-operated means also under control of the operator to cause the leveling pressure to be applied to the margins of the sole. The jack 22 is, in many respects, similar to the disclosure of Letters Patent No. 1,935,625, granted on November 21, 1933, upon an application of Andrew Eppler, and comprises a toe post 26 fast on a short transversely extending rock-shaft 28 mounted in suitable bearings in the frame 20 and a heel post 30 loosely mounted on the shaft 28. The toe and heel posts are provided with means for supporting the shoe and last for the leveling operation comprising an adjustable toe support 32 carried by the toe post 26 and a spindle 34 carried by the heel post 30, the construction being such that a long legged boot also may be supported on the jack. The spindle 34 extends through an enlarged opening formed in a plate 36 also carried by the heel post 30, which plate is free to tip about an axis extending laterally of the shoe to adjust itself to the top face of the cone of the last. This plate and the toe support 32 are constructed substantially as disclosed in Letters Patent No. 1,962,141, granted June 12, 1934, upon an application of Andrew Eppler and, accordingly, are not described herein in detail. The spindle 34 is carried by a block 38 which is pivoted at 40 to the top of the heel post 30 to swing in directions lengthwise of the shoe. The block 38 is connected by a link 42 to mechanism which will presently be described whereby the block and spindle may be swung to press the toe end of the shoe firmly down upon the toe support 32.

Figure 13:
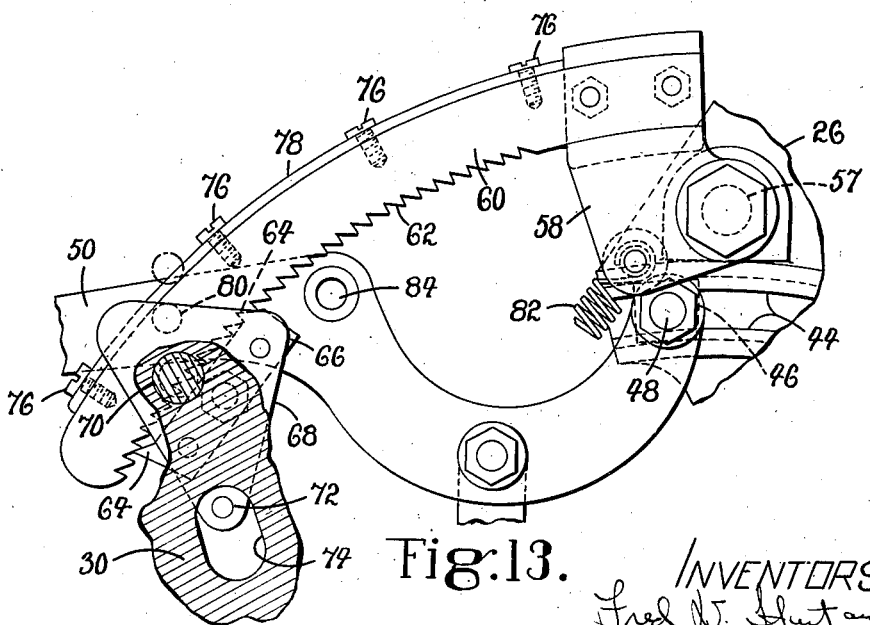
Fig. 13 is an enlarged detail view in side elevation showing the means for locating the toe and heel posts of the shoe support in adjusted relation.

Formed in the opposite side faces of the toe post 26 are curved slots 44 concentric with the axis of the shaft 28 and slidably mounted in the slots 44 are blocks 46 (Figs. 9 and 10) which are pivotally connected at 48 two arms of a bifurcated lever 50 for tipping the spindle 34. The lever 50 is arranged to be locked to a toothed segment 52 on the heel post by a spring-pressed latch pin (not herein shown) which may be withdrawn to unlock the lever by means of a finger latch 54. At its upper end the segment 52 is provided with a slot 56 to retain the lever 50 in an elevated position during the mounting of a last and shoe on the jack. In the illustrated construction the heel post is freely movable by the operator toward and from the toe post to adjust the jack to accommodate shoes of different lengths and to position the ends of the toes of shoes of different lengths in substantially the same location. For locking the toe and heel posts together in adjusted relation there is pivotally connected at 57 to the toe post (Fig. 13) an arm 58 to which there is secured a toothed segment 60 the teeth 62 of which are arranged to engage teeth 64 formed on a ratchet plate 66 which is secured to a second plate 68 pivotally connected at 70 to the heel post 30 and carrying a pin 72 which is arranged to extend into a slot 74 in the heel post to limit swinging movement of the ratchet plate 66. Secured to the toothed segment 60 by screws 76 is a laterally extending curved plate 78 and carried by the lever 50 is a pin 80 which is arranged by engagement with the plate 78 to hold the segment 60 out of engagement with the ratchet plate 66 when the lever 50 is in elevated position. Connected at one end to the arm 58 and at the other end to the toe post 30 is a balance spring 82 which tends to hold the heel post in any position into which it has been moved by the operator, against movement away from the toe post.

The illustrated machine may also be provided with a saddle (not herein shown) for use in jacking the shoe alternatively with the spindle tipping mechanism referred to above. The saddle may be substantially like that shown in Letters Patent No. 1,263,361, granted on April 23, 1918, upon an application of W. C. Baxter, each arm of the bifurcated lever 50 being provided with an opening 84 to receive the saddle connections. It will be understood that when a saddle is used the lever 50 is swung downwardly from elevated position to pull the saddle tightly over the shoe and is then locked to the segment 52, the spring 82 acting on the arm 58 to move the segment 60 into engagement with the ratchet plate 66 to lock the toe and heel posts in adjusted position as the lever 50 is thus moved.

The relation of the lever 50 to the spindle tipping mechanism will now be described. Pivotally connected at 86 to the heel post 30, one on each side thereof, are links 88 the rear ends of which are connected to the arms of the lever 50 by short upwardly extending links 90 (Fig. 9). The links 88 have pivotally connected thereto at 92 downwardly extending links 94 which carry a horizontal pin 96 extending through a slot 98 (Fig. 10) formed in a member 100 pivoted to the lower end of the link 42. Pivotally connected to the member 100 is a member 102 which may be swung up into position to serve as an abutment for the horizontal pin 96. When the member 102 is in this position downward movement of the lever 50 forces the link 42 downwardly to operate the spindle 34 by engagement of the pin 96 with the member 102. The member 102 is held in its uppermost position by a spring-pressed pin 104 in the member 100 which enters a hole in the member. It will be understood that as the lever 50 is swung downwardly to operate the spindle tipping mechanism the segment 60 is swung downwardly into engagement with the ratchet plate 66 to lock the toe and heel posts in adjusted relation. If the machine is provided with a saddle the member 102 is swung downwardly into a position in which it will not obstruct free movement of the pin 96 in the slot 98 so that no motion is imparted to the link 42 as the lever 52 is swung downwardly in operating the saddle. The mechanism for thus rendering the lever 50 effective to operate either a saddle or the link 42 is generally similar to the disclosure of Letters Patent No. 1,719,158, granted July 2, 1929, upon an application of E. E. Winkley and H. A. Davenport.

The illustrated machine is further provided with additional means for supporting the shoe in the pressure applying operation. This means, which is generally similar to the disclosure of Letters Patent No. 2,104,739, granted on January 11, 1938, upon an application of Andrew Eppler and J. P. Fredericksen, comprises a support for the shoe between the heel end and forepart. This support comprises a rubber pad 105 (Fig. 14) hollowed out to receive the wedge-shaped instep portion of the last or shoe and a holder 106 on which the pad is supported. The holder 106 is connected to a slide 108 for limiting swinging movement about an axis extending laterally of the shoe to permit the pad 105 to adjust itself to each shoe. The slide 108 is mounted for movements in directions heightwise of the shoe in a boss 110 on the toe post 26 and is upheld with the pad 105 in position to be engaged by the shoe by a spring 111 which is mounted in a central recess 110 and surrounds a downwardly extending rod 112 fast to the slide between a shoulder on the slide and a plate 114 secured to the end of the boss 110. The rod 112 extends through an opening in the plate 114 and surrounding the lower end portion of the rod between the plate and a nut and locknut 116 threaded on the rod is a heavy compression spring 118 which limits upward movement of the slide 108. For imparting upward movement to the slide 108 to force the pad 105 more firmly against the last or shoe in response to rearward movement of the jack 22 to carry the toe end of the shoe under the leveling roll 24 there is provided a shaft 122 which, as shown more fully in the above-mentioned Letters Patent No. 2,104,739, is geared to the slide 108 and is rotatably mounted in a bushing 124 in a laterally extending projection 126 on the toe post 26. Keyed to one end portion of the shaft 122 is a wheel 128 surrounded by a sleeve 130 which is adjustable about the axis of the shaft 122 upon an enlarged end portion of the projection 126. Formed on the wheel 128 are ratchet teeth 132 and fulcrumed on the sleeve 130 is an arm 134 in which there is slidably mounted a pawl 136 which is urged by a spring 138 in a direction to engage one of the ratchet teeth 132 when permitted to do so by the sleeve 130 which only partially surrounds the ratchet teeth and acts when the parts are in their initial positions as a shield to hold the pawl 136 out of engagement with the ratchet teeth 132. In the illustrated construction the arm 134 which is similar to the arm 88 in the Letters Patent No. 2,104,739 referred to above carries a pin 140 which is held in engagement with the slotted end of a link 142 by a spring 144 connected at one end to a pin 145 carried by a projection 147 formed on the arm 134 and at the other end to a pin 146 projecting from a depending arm 148 on the projection 126.

At its opposite end the link 142 is pivotally connected to the upper end of a lever 150 (Fig. 1) pivotally connected at 152 to an arm 154 which surrounds the shaft 28 and is secured to the toe post 26 by a bolt 156. Projecting from the arm 154 is a pin 158 and extending between this pin and a rearward projection 160 on the lever 150 is a spring 162 which tends to swing the lever in a direction to hold a roll 164 carried by the lever in engagement with an inclined surface 166 formed on a guard member 168 secured to the frame 20 of the machine. As the jack 22 is swung about the axis of the shaft 28 in a direction to carry the toe end of the shoe under the leveling roll, the lever 150 and through the link 142 the arm 134 are swung in a direction to release the pawl 136 to the action of its spring 138 which moves the pawl into engagement with the ratchet teeth 132, thereby locking the arm 134 to the wheel 128 so that in the continued swinging movement of the arm 134 the shaft 122 is rotated in a direction to impart upward movement to the slide 108 to force the pad 105 more firmly against the shoe. The arrangement of the parts is such that substantially at the time when the toe end of the shoe is moved under the leveling roll 24 the roll 164 carried by the lever 150 is moved downwardly out of engagement with the inclined face 166 on the guard member 168. Pivotally connected at 170 to the toe post 26 is a latch 172 which is normally held by a spring 174 with its upper end in engagement with a roll 176 on the guard member 168. As the jack is moved rearwardly from its initial position the spring 174 acts to swing the latch relatively to the toe post 26 and the lever 150 into position to engage a pin 178 projecting from the lever 150, the construction being such that the latch 172 is moved into position to engage the pin substantially at the time when the roll 164 is moved out of engagement with the inclined surface 166. It will be understood that as the jack 22 is thereafter swung rearwardly and forwardly beneath the leveling roll 24 the lever 150 is held by the latch 172 against reverse swinging movement and the slide 108 is positively locked against downward movement by the engagement of the pawl 136 with the ratchet teeth 132. At the end of the leveling operation, as the jack is moved forwardly to its initial position to carry the toe end of the shoe out from under the leveling roll, the roll 176 engages the latch 172, after which the pin 178 is moved out of engagement with the latch. This causes the lever 150 to be released to the action of its spring 162 and the arm 134 to be released to the action of its spring 144 which swings the arm in a direction to cause the sleeve 130 to cam the pawl 136 out of engagement with the ratchet teeth 132 to unlock the slide 108.

In the illustrated machine the rearward and forward swinging movements of the jack 22 about the shaft 28 and the tipping movements of the roll 24 laterally of the shoe are effected by power through the action of fluid pressure means. For imparting to the jack its swinging movements there is provided a fluid operated member 180 (Fig. 9) on which are formed rack teeth 182 engaged by the teeth of a pinion 184 fast on a transversely extending shaft 186 mounted in suitable bearings in a bracket 187 which is supported by a transversely extending shaft 189 supported in bearings in the frame 20 and by a substantially V-shaped cross-bar 191 secured to the frame by screws 193. The teeth of the pinion 184 engage also segmental teeth 188 formed on the arm 154 fast to the toe post 26 of the shoe supporting jack. Secured to the opposite ends of the member 180 are pistons 190, 192 slidably mounted in cylinders 194, 196. Connected to the cylinder 194 at its lower end is a pipe 198 through which pressure fluid, preferably oil, may be admitted to the cylinder to raise the piston 190 and the member 180 to impart to the jack a rearward swinging movement, and connected to the cylinder 196 at its upper end is a pipe 200 through which the pressure fluid may be admitted to the cylinder 196 to move the piston 192 and the member 180 downwardly to impart forward swinging movement to the jack, the pipes 198, 200 being connected at their opposite ends to a valve casing 202 in which there is valve mechanism, hereinafter described, movable by the operator to control the flow of fluid to and from either one of the cylinders 194, 196 and thus to control the direction of swinging movement of the jack. For imparting to the leveling roll 24 its tipping movements laterally of the shoe there is provided a fluid operated member 204 (Fig. 3) having formed thereon rack teeth 206 engaged by the teeth of a segment gear 208 fast to a laterally extending shaft 210 supported by suitable bearings formed in a bracket 211 which is supported by the laterally extending shaft 189 and the cross-bar 191. Secured to the outer end of the shaft 210 is a lever 212 connected by an adjustable link 214 (Fig. 1) to a laterally extending arm 216 on a roll carrier 218 that is mounted for tipping movements laterally of the machine about the axis of a forwardly and rearwardly extending shaft 220 supported in bearings at the top of the frame 20. The member 204 has fast to its opposite ends pistons 222, 224 (Fig. 3) slidably mounted in cylinders 226, 228 supported by the bracket 211 and connected respectively at their lower and upper ends by pipes 230, 232 to a valve casing 234 in which there is valve mechanism also movable by the operator to control the flow of fluid to one or the other of the cylinders 226, 228 and thus to control the direction of tipping movement imparted to the carrier 218 and the leveling roll 24. The pressure fluid is supplied by a continuously operating gear pump 236 (Fig. 4) which is connected by gears 235, 237 to a shaft 239 on the outer end of which is fastened a pulley 238 connected by a belt (not shown) to any convenient source of power, such, for example, as an electric motor (not herein shown). The fluid is drawn from a reservoir 240 in the lower portion of the frame 20 and is forced by the pump through a supply pipe 242, a valve casing 246 in which there is fitted to slide novel valve mechanism, hereinafter described, for controlling the pressure of the operating fluid, and a pipe 248 to the valve casings 202 and 234.

The valve casing 202 (Fig. 15) is provided with ports 250, 252 communicating respectively with the pipes 198 and 200 and intermediate between these ports with a third port 254 communicating with the pipe 248. The casing 202 is bored to receive a sleeve 256 and is closed at its lower end by a cap 258 secured by screws 260 to the casing and at its upper end by a cap 262 secured by screws 263 to the casing, the caps 258, 262 having circular projections thereon fitting the bore in the casing and engaging the top and bottom faces of the sleeve 256. The sleeve 256 is provided with ports 264, 266 opposite the ports 250, 252 in the casing and with a port 268 opposite the port 254, the ports in the sleeve 256 each comprising an annular groove and holes connecting the annular groove and the interior of the sleeve. Fitted to slide within the sleeve 256 is a hollow valve member 270 having formed on its opposite end portions flanges which act normally to close the ports 264, 266 in the sleeve and having its intermediate portion reduced in thickness to form with the sleeve 256 an annular chamber 272 communicating through the ports 268 and 254 with the pipe 248.

The valve member 270 is controlled manually by a hand lever 274 (Figs. 9 and 10) which is pivoted at 276 to a boss 277 on the frame 20 and is connected by a link 278 to the downwardly extending arm 280 of a bell-crank lever 282 pivoted at 284 to the frame 20 (Fig. 15). The lever 282 is provided with a forwardly extending arm 286 connected by upwardly extending links 288 to a lever 290 that is pivoted at one end to the head 292 of a rod 294 and at the other end is connected by downwardly extending links 296 (Fig. 9) to a vertically movable slide 298 having formed thereon rack teeth 300 meshing with the teeth of a small pinion 302 fast to the shaft 186. The cap piece 262 secured to the upper end of the valve casing 202 is bored to receive the rod 294, the lower end of which is held in engagement with a cross-bar 304 (Fig. 15) by a relatively stiff spring 306. The spring 306, which at its upper end is connected to the rod 294, extends downwardly through the hollow valve member 270 and is connected at its lower end to a similar cross-bar 308, the bars 304, 308 engaging respectively the top and bottom faces of the valve member 270. The parts are so arranged that when the operator swings the hand lever 274 rearwardly the valve 270 is moved downwardly to open the ports 264, 250 to permit the pressure fluid to flow from the chamber 272 through the pipe 198 to the cylinder 194 to cause a rearward swinging movement to be imparted to the jack 22. Similarly, when the operator swings the hand lever in the opposite direction, the valve 270 is raised to open the ports 266, 252 and thus to cause the jack to be swung forwardly. When the operating fluid is admitted to either one of the cylinders 194, 196, a passage is provided for the exhaust of the fluid from the other cylinder to the reservoir 240, the fluid exhausting from the pipe 200 through the ports 252, 266 and the hollow valve member 270 into a pipe 310 extending downwardly from the cap piece 258 into the reservoir 240, and from the pipe 198 through the ports 250, 264 into the interior of the sleeve 256 and thence through the pipe 310 to the reservoir.

By reference to Fig. 9 it will be seen that, as the arm 154 is swung downwardly to impart rearward swinging movement to the jack 22 in response to upward movement of the member 180, the slide 298 is moved downwardly by reason of its connection with the shaft 186 through the rack teeth 300 and the pinion 302. As the slide 298 is thus moved, it tends to swing the lever 290 about its pivotal connection to the links 288 in the direction to raise the valve 270 to close the ports 264, 250 and thus to stop the rearward swinging movement of the jack, unless the operator is at the same time moving the hand lever 274 rearwardly to counteract this tendency to close the ports. Similarly, upward movement of the slide 298 in response to downward movement of the member 180 tends to swing the lever 290 in the direction to move the valve 270 downwardly to close the ports 266, 252 to stop forward swinging movement of the jack, unless the hand lever 274 is being moved by the operator to counteract this tendency to close the ports 266, 252. It will be evident that the slide 298 thus cooperates with the hand lever 274 to limit variably, as determined by the extent of the movement of the hand lever in opposite directions respectively, the extent of the rearward and forward swinging movements of the jack. By manipulation of the hand lever, the operator may start, stop, or reverse the swinging movement of the jack at will. Thus the leveling roll may be caused to operate progressively along the forepart and shank portions of the shoe bottom, and its operation on any portion of the forepart or shank may be repeated as many times as desired, the jack being brought almost instantly to a stop with the roll at any desired point merely by stopping the movement of the hand lever.

It will be evident also that the jack may be swung at different rates of speed, depending upon how widely the ports 264, 266 are opened, and this will depend, of course, upon the speed of movement of the hand lever 274. In order to limit the extent of which the valve 270 may be moved to open the port 264, there is provided an adjustable stop illustrated as a collar 312 (Fig. 15) formed on a rod 314 threaded into the cap piece 262. The rod extends upwardly through an opening in an arm 316 formed on the head 292, and threaded on the upper end of the rod are a nut and lock nut 318. The collar 312 limits downward movement of the valve 270 to open the port 264, and the nut and lock nut 318 limits upward movement of the valve to open the port 266. If the rate of movement of the hand lever 274 is accelerated fast enough in either direction to move the arm 316 into engagement with one or the other of the stops, the jack will thereafter be swung at the maximum rate of speed. It will be readily seen that in the event of an abnormal acceleration in the speed of movement of the hand lever 274 in either direction, engagement of the arm 316 with one or the other of the stops will thereafter retard further movement of the hand lever.

Figure 16:
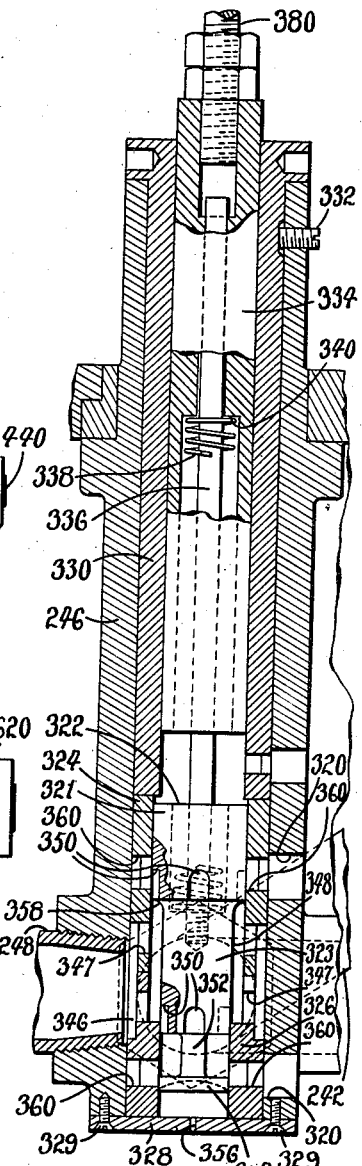
Fig. 16 is a vertical sectional view on an enlarged scale of the pressure controlling valve mechanism shown in Fig. 4.

When the machine is initially at rest, the fluid is maintained under a predetermined low pressure by a valve in the casing 246 which is held open by the pressure fluid against the resistance of a spring to permit the excess fluid to return to the reservoir 240 through ports 320 in the casing (Figs. 4 and 16). The valve comprises a cylindrical member 322 having a head portion 321 and a body portion 323 that are fitted to slide in bushings 324, 326 in the casing 246. The lower end of the casing is partially closed by a plate 328 secured to the casing by screws 329, and above the bushing 324 there is mounted in the casing a sleeve 330, the lower end of which engages the bushing 324 and the upper end of which is flanged to engage the top face of the casing, a set screw 332 being provided for holding the sleeve against endwise movement in the casing. Fitted to slide in the sleeve 330 is a plunger 334 provided with a central opening for a rod 336 that extends downwardly and is threaded into the valve member 322. The valve member 322 is counterbored to receive a spring 338 that surrounds the rod 336 and bears at its upper end against a shoulder 340 on the plunger 334. The casing 246 (Fig. 6) is provided with ports 342, 344 that communicate respectively with the pipes 242 and 248, and the bushings 324, 326 opposite these ports are recessed to provide an annular chamber 346 (Fig. 16) through which the pressure fluid may flow from the pipe 242 to the pipe 248.

As shown, the head and body portions of the valve member 322 are of different diameters, the head portion 321 being fitted to slide in the bushing 324 and the reduced body portion 323 being fitted to slide in the bushing 326. There is formed around the body portion of the valve by the bushings 324, 326, and the casing 246 an annular chamber 348 that communicates with the chamber 346 through holes 347 in the bushings 324, 326 (Fig. 16). The head and body portions of the valve 322 are provided with a plurality of ports or notches 350, and extending downwardly from the body portion is a stem 352 on the lower end of which is formed a circular flange or disk 354 fitted to slide in the bushing 326. The disk 354 has its bottom face concaved, and formed in the plate 328 is a small central opening 356. The spring 338 tends to move the valve 322 downwardly to carry the disk 354 toward the plate 328 but is arranged to yield in response to the pressure of the fluid on a shoulder 358 on the valve to permit upward movement of the valve into the position shown in Fig. 16, which is its normal position, with the ports 350 permitting escape of the excess fluid into the reservoir 240 through ports 360 in the bushings 324, 326 and the ports 320 in the casing 246, the action of the fluid on the disk 354 tending to retard the movements of the valve 322 in opposite directions to prevent objectionable vibration of the valve. The tension of the spring 338 is such that the fluid in the pipe 248 is thus maintained under sufficient pressure to operate the member 180 to swing the jack 22 rearwardly upon rearward movement of the hand lever 274 by the operator to bring the toe end of a shoe on the jack under the leveling roll 24.

Fast on the toe post 26 of the jack is a downwardly extending arm 362 (Figs. 9 and 10) engaging a roll 364 carried by an upwardly extending arm 366 (Figs. 10 and 11) fast on a laterally extending shaft 368 supported by the frame 20. Fast to the shaft 368 is a second arm 370 to the upper end of which is connected a rearwardly extending rod 372 horizontally movable in bearings in the frame 20. Surrounding the rod 372 (Figs. 3 and 9) between an adjustable nut and lock nut 374 threaded on the rod and a fixed stop 376 on the frame 20 is a relatively heavy expansion spring 378 that tends to move the rod forwardly and to hold the roll 364 in engagement with the arm 362. Threaded adjustably into the upper end of the plunger 334 (Fig. 4) is a rod 380 held in adjusted position by a nut and lock nut 382 on the rod engaging the upper end face of the plunger 334, and pivotally connected to the rod 380 is one link 384 of a toggle the other link 386 of which (Fig. 9) is fast to a rock shaft 388 supported by a bracket 390 secured by screws 392 to the brackets 187 and 211. Fast to the opposite end portion of the rock shaft 388 (Fig. 5) is a downwardly extending arm 394 in the lower end of which is formed a bearing for the shank portion of a block 396 that is recessed to straddle a bushing 398 which is fast on the rod 372 and is provided with a head 399. Slidably mounted on the rod 372 is a bushing 400, the head 402 of which is held in engagement with the end of the bushing 398 by a spring 404 that surrounds the bushing 400 and the rod 372 and bears at its opposite end against a collar 406 fast to the rod 372. When the parts are in their initial starting positions, the toggle links 384, 386 are in the positions shown in Fig. 4 with the block 396 in engagement with the head 402 of the bushing 400 and with an adjustable stop, illustrated as a screw 408 carried by the link 386, in engagement with a stop face 410 on the bracket 390. As the rod 372 is moved forwardly by the spring 378 in response to rearward swinging movement of the jack 22 to carry the toe end of the shoe toward the leveling roll 24, the spring 404 acts on the bushing 400 and the block 396 to swing the toggle links 384, 386 into substantially parallel relation, with an adjustable stop, illustrated as a screw 412 carried by the link 386 in engagement with a stop face 414 on the bracket 390. As the toggle links are thus swung, they act through the rod 380 to move the plunger 334 downwardly further to compress the spring 338 which tends to move the valve 322 downwardly into a position to prevent escape of the fluid through the ports 360, 320 to the reservoir. When the valve 322 is thus moved, fluid pressure builds up in the pipes 242 and 248 and, when sufficient to overcome the increased resistance of the spring 338, moves the valve 322 again into the position shown in Figs. 4 and 16 to permit escape of the excess fluid through the ports 360, 320. It will be understood that the resistance of the spring 338 is thus increased by the straightening of the toggle links 384, 386 to cause greater power to be applied to the pistons 190, 192 to swing the shoe support when the leveling roll 24 is operating on the shoe. It will be understood also that by relative adjustment of the plunger 334 and rod 380 tension of the spring 338 may be varied to permit escape of the fluid under any desired predetermined pressure, the valve thus controlling the pressure of the operating fluid supplied by the pump 236.

The machine herein shown is so constructed that the leveling roll 24 is maintained initially in a position lower than that which it occupies in operating upon the shoe and is lifted at a predetermined time in the first rearward swinging movement of the jack to prevent interference between the roll and the toe end of the sole, thus insuring against any damage to the sole or undue bending of its margin at the toe end by contact of the roll with its edge. The roll is mounted for turning movement on a rod 416 (Fig. 2) in a holder 418, springs 420 being provided for engaging the opposite end faces of the roll and acting normally to centralize the roll lengthwise of the rod while permitting it to move in one direction or the other along the rod for better accommodation to the shapes of different portions of the shoe bottom. The holder 418 is pivotally connected at 420 (Fig. 1) to the carrier 218 and has a rearwardly extending arm 422 connected by a short link 424 to the rearwardly extending arm 426 of a bell-crank lever 428 fulcrumed at 430 to the carrier 218. The bell-crank lever 428 has a pair of downwardly extending arms 432 carrying trunnions 434 extending into a circumferential groove 436 formed in a bushing 438 that is slidably mounted on the shaft 220. Pivotally mounted on a laterally extending shaft 440 supported by suitable bearings in the frame 20 is an upwardly extending arm 442 the upper portion of which is forked to straddle the bushing 438, the arms of the forked portion carrying trunnions 444 extending into a circumferential groove 446 in the bushing 438. Mounted on the shaft 440 is a downwardly extending yoke member 448 and connected to this member by a threaded rod 450 is a yoke-shaped member 452 between the arms of which at their lower ends there is pivoted a lever 454. The lever 454 has oppositely extending arms of equal lengths to the ends of which are pivotally connected abutments 456, 458 for relatively heavy expansion springs 460, 462. At its upper end, the spring 462 bears against an abutment 464 pivoted at 466 to the frame 20. The spring 460 at its upper end engages an abutment 468 pivotally connected to an arm 470 integral with the arm 442. The abutments 456, 458 are each provided with an upwardly extending reduced portion 471 to which there is secured a rod 473. The rods 473 extend upwardly into central openings formed in downwardly extending reduced portions 475 on the abutments 464, 468. It will be evident that the springs 462, 460 tend to swing the arms 470, 442 in a clockwise direction, as viewed in Fig. 1, to move the sleeve 438 rearwardly on the shaft 220 and to impart downward swinging movement to the holder 418 to lower the leveling roll 24, the initial position of which is determined by engagement of the arm 442 with an adjustable stop illustrated as a screw 472 threaded in the frame 20, a lock nut 474 being provided for holding the screw in adjusted position. The rod 450 connecting the yoke-shaped members 448, 452 has right and left-hand threads formed on the opposite end portions so that by rotation of the rod the member 452 may be moved relatively to the member 448 to vary the tension of the springs 460, 462. Formed on the rod 450 is a central collar 476 provided with a plurality of holes into any one of which the operator may insert the end of a tool to assist him in turning the rod.

Formed integral with the arm 442 (Fig. 1) is a third arm 478 connected by an adjustable link 480 to one end of a lever 482 pivoted intermediate between its ends to a bracket 484 secured by screws 486 to the frame 20. The lever 482 has its opposite end portion forked to straddle a plunger 488, the arms of the forked portion carrying trunnions 490 that extend into a peripheral groove 492 formed in the upper end of the plunger 488 (Fig. 8). The plunger is fitted to slide in a cap piece 494 and has on its opposite end a T-shaped projection 496 extending into a similarly shaped slot 498 in a piston 500 that is fitted to slide in a cylinder 502. The cap piece 494 is counterbored to receive the upper end of the cylinder 502 and is secured by screws 504 to a bracket 506 with the cylinder extending into a bore 508 in the bracket and engaging at its lower end a spacer 510 provided with a central opening 512 through which the cylinder communicates with a chamber 514 in the bracket 506. Fitted to slide in the chamber 514 is a piston 516. The piston 516 is counterbored to receive a spring 518 that bears at its upper end against the spacer 510 and acts normally to hold the piston 516 in engagement with a pin 520 projecting upwardly from a plate 522 that is secured to the bracket 506 by screws 524 to close the lower end of the chamber 514. The bracket 506 is provided with a bore 526 to receive a cylindrical valve 528 which is held normally in the position shown in Fig. 8 to permit pressure fluid to flow from the casing 246 through a pipe 530 past the valve 528 and through a port 532 into the chamber 514. At a predetermined time in the rearward swinging movement of the jack 22, as more particularly hereinafter described, the valve 528 is moved downwardly into a position to interrupt the flow of pressure fluid to the chamber 514 and to open a port 534 connecting the cylinder 502 below the piston 500 through the bore 526 with a small reservoir 536 for the fluid above the valve 528. As shown, the bracket 506 is recessed to provide annular chambers 538 and 540 connected by a port 541 through which the pressure fluid flows from the pipe 530 to the port 532. When the valve is moved downwardly it closes the port 541, thereby disconnecting the chambers 538 and 540, the fluid being free, however, to flow from the chamber 514 through the port 532 into the chamber 540 and thence upwardly in the bore 526 and through openings 542 in the valve 528 into the reservoir 536 in response to downward movement of the piston 516, and from the cylinder 502 through the port 534 and the bore 526 into the reservoir 536 in response to downward movement of the piston 500. Overflow of fluid from the reservoir 536 is permitted through openings 544 in the bracket 506 that lead downwardly into the main reservoir 240.

At its upper end the reservoir 536 is closed by a plate 546 secured to the bracket 506 by screws 548. The plate 546 is bored to receive a rod 550 on the lower end of which is formed a T-shaped tongue 552 extending into a similarly shaped groove in the valve 528. At its upper end the rod 550 is connected by short links 551 (Fig. 8) to a lever 554 pivotally connected at 556 to the cap piece 494. The lever 554 has an upwardly extending arm 558 (Fig. 4) carrying an eye bolt 560 to which is connected one end of a spring 562, the other end of which is connected to a pin 564 projecting upwardly from the bracket 390. The spring 562 tends to swing the lever 554 in a direction to impart upward movement to the rod 550 to move the valve 528 into the position shown in Fig. 8, the movement of the lever in this direction under the influence of the spring being limited by the engagement of a projection 566 formed on the head of the rod 550 with an adjustable stop, illustrated as a screw 568 carried by a projection 570 on the plate 546, a lock nut 572 being provided for holding the screw in adjusted position.

As previously stated, the spring 518 (Fig. 8) acts initially to hold the piston 516 in engagement with the pin 520, the pressure of the fluid in the chamber 514 being insufficient at this time to lift the piston against the resistance of the spring 518 and the springs 460, 462. As the pressure of the operating fluid, however, is increased through the straightening of the toggle links 384, 386 it moves the piston 516 upwardly and through the fluid trapped between the piston 516 and the bottom of the piston 500 also moves the piston 500 until the piston 514 engages the spacer 512. As the piston 500 is thus moved upwardly in the cylinder 502 it acts through the lever 482 and the rod 480 to swing the arms 478, 442 in a counterclockwise direction, as viewed in Fig. 1, to raise the leveling roll to a level higher than the bottom of the shoe. As the toe end of the shoe is moved under the leveling roll, an adjustable collar 574 (Fig. 4) fast on the rod 372 acts by engagement with a block 576 pivotally connected to a downwardly extending arm 578 on the lever 554 to swing the lever against the resistance of the spring 562 in a direction to move the valve into position to close the port 541 and to open the port 534 to the reservoir 536. With the port 541 closed and the port 534 open, the arm 442 is released to the action of the springs 460, 462 which swing the arm reversely in the direction to press the leveling roll yieldingly against the bottom of the shoe. The piston 516 is provided with a small central opening 579 through which the pressure fluid may flow from the chamber 514 into the cylinder 502 to insure that a column of fluid will be maintained at all times between the piston 516 and the bottom of the piston 500.

In order to prevent too sudden a release of the leveling roll 24 to the action of the springs 460, 462, such as might tend to cause the roll to impart a hammer blow to the bottom of the shoe, there is provided a fluid check for retarding the movement of the lever 554 in the direction to move the valve 528 into position to close the port 541 and thus to disconnect the source of pressure fluid from the cylinder 514 and to open the port 534. Pivotally connected to the lever 554 (Fig. 4) by short links 580 is a small piston 582 fitted to slide in a bore 584 (Fig. 7) in the bracket 506, the bore being connected to the reservoir 536 through a small central opening 586 and a laterally extending passage 588 the outer end of which is closed by a screw plug 590. At its lower end the bore 584 is formed to provide a seat for a ball valve 592 that may be displaced more or less relatively to its seat by an adjustable screw 594 threaded into the bracket 506 and held in adjusted position by a lock nut 596. Preferably the screw 594 is so adjusted that the ball valve 592 is displaced slightly relatively to its seat to provide a comparatively small opening for the exhaust of the fluid from the bore 584 to the reservoir 536 as the piston 582 is moved downwardly in the bore in response to downward swinging movement of the lever 554 to move the valve 528 into position to close the port 541 and to open the port 534. It will be evident that the fluid is permitted to flow freely from the reservoir 536 by the ball valve 592 into the bore 584 in response to upward movement of the piston 582 and that, as the piston moves downwardly in the bore, the fluid tends to press the ball valve against its seat, the screw 594, however, holding the ball valve displaced sufficiently to permit a comparatively slow exhaust of the fluid from the bore. This tends to retard the downward swinging movement of the lever 554 to move the valve 528 into position to disconnect the source of pressure fluid from the cylinder 514 and to open the port 534. As a result, the fluid is exhausted at a comparatively slow rate from the cylinder 502, thus retarding downward movement of the piston 500 and the rearward swinging movement of the lever 442 to move the leveling roll 24 downwardly into engagement with the bottom of the shoe. It will be understood that with the valve 528 in position to close the port 541 and to open the port 534 the leveling roll is released fully to the action of the springs 460, 462, the port 541 preferably being fully closed substantially at the time when the roll 24 engages the bottom of the shoe. With the port 541 fully closed, the spring 518 acts to move the piston 516 downwardly and to hold it in engagement with the pin 520. It will be understood that as the jack is swung rearwardly and forwardly beneath the leveling roll 24 the heightwise position of the leveling roll is varied in accordance with variations in the lengthwise curvature of the shoe bottom. Any variation in the heightwise position of the leveling roll will cause a corresponding variation in the relative positions of the piston 516 and 500, the piston 500 being movable in the cylinder 502 in response to heightwise movement of the leveling roll and the reservoir 536 supplying or receiving fluid from the cylinder 502 to maintain at all times a column of fluid between the two pistons 500, 516. Accordingly each time the valve 528 is moved into the position shown in Fig. 8 to close the port 534 and to open the port 541, the piston 516 is moved upwardly and through the trapped fluid between it and the bottom of the piston 500 moves the piston 500 upwardly to lift the leveling roll from contact with the bottom of the shoe regardless of the heightwise position of the leveling roll.

The valve mechanism in the casing 234 (Fig. 3) for controlling the flow of pressure fluid to one or the other of the cylinders 226, 228 is identical in construction with that previously described in the casing 202 for controlling the flow of the pressure fluid to one or the other of the cylinders 194, 196, the valve casing being provided with ports 598, 600 communicating respectively with the pipes 230, 232 and a port 602 intermediate between the ports 598, 600 communicating with the supply pipe 248 (Fig. 3). A sleeve 604 in the casing 234 has ports 606, 608 opposite the ports 598, 600 and a port 610 opposite the port 602, each port in the sleeve 604 comprising an annular groove and holes connecting each groove with the interior of the sleeve. A hollow valve member 612 fitted to slide in the sleeve 604 has its opposite end portions flanged to close the ports 606, 608 and its intermediate portion reduced in thickness to form an annular chamber 614 communicating through the ports 610, 602 with the pipe 248. The valve member 612 is controlled manually by a hand lever 616 which is pivotally connected at 618 to a boss 620 on the frame 20 (Fig. 1). Pivotally connected to the hand lever 616 is a link 622 the rear end portion of which is pivotally connected to the lower end of a downwardly extending arm 624 (Fig. 3) of a bell crank lever fulcrumed at 626 to the frame 20. The bell crank lever has a forwardly extending arm 628 connected by short upwardly extending links 630 to a lever 632 one end of which is pivotally connected to the head 634 of a rod 636 that extends downwardly through a bore in a cap piece 638 secured to the upper end of the casing 234 by screws 640. At its opposite end, the lever 632 is connected to the upper end of a link 642 the lower end of which is pivotally connected to a forwardly extending arm 644 on the lever 212. Similarly to the rod 294 of the valve casing 202, the rod 636 is held by a relatively stiff spring 646 in engagement with a cross-bar 648 that engages the top face of the valve member 612, the spring 646 extending downwardly through the hollow valve member 612 and being connected at its lower end to a crossbar 650 engaging the bottom face of the valve member. A cap piece 652 connected to the casing 234 by screws 654 for closing the lower end of the casing has extending downwardly therefrom a pipe 656 to provide a passage for the exhaust of the fluid from one or the other of the cylinders 226, 228 through the ports controlled by the valve member 612 and the interior of the casing 234 to the reservoir 240.

Figure 2:
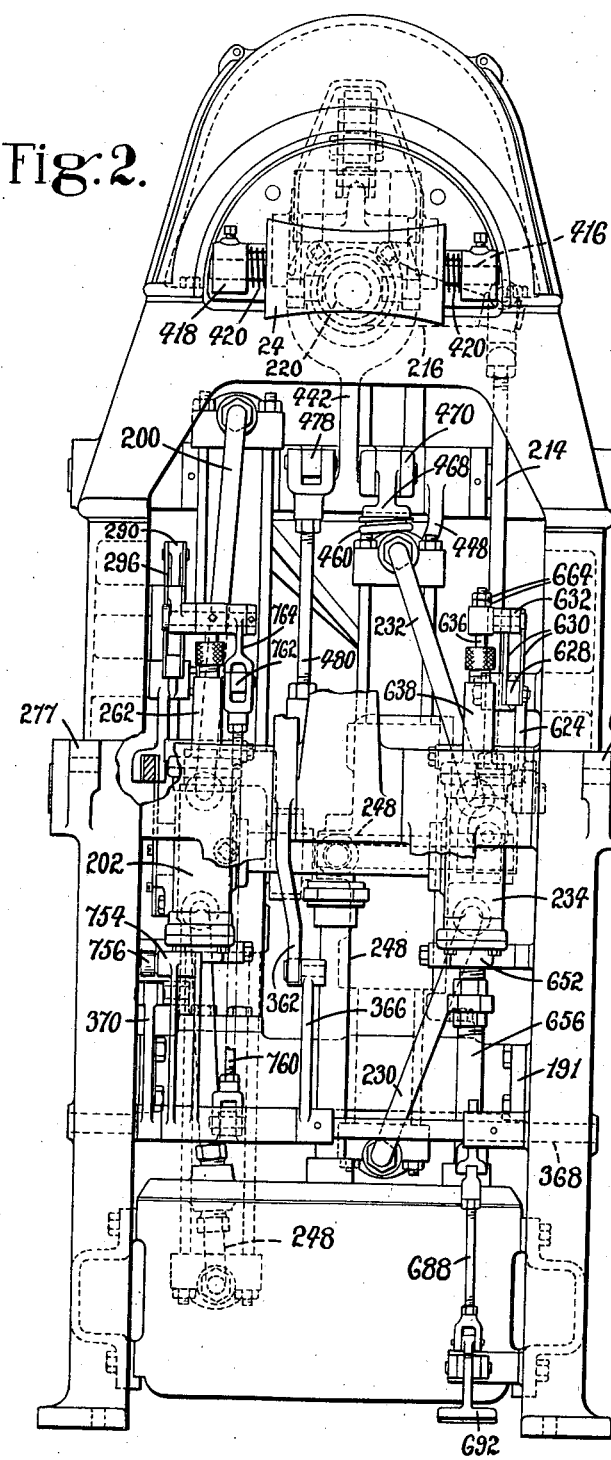
Fig. 2 is a view in front elevation of the machine shown in Fig. 1 with the shoe-supporting means removed.

From the above description it will be evident that the operator may by rearward movement of the hand lever 616 move the valve member 612 downwardly in the casing 234 to open the ports 606, 598 and thereby admit pressure fluid into the cylinder 226 to cause upward movement to be imparted to the member 204 and thus to tip the leveling roll in a counterclockwise direction, as viewed in Fig. 2, about the axis of the shaft 220; or, by forward movement of the hand lever 616, he may move the valve member 612 upwardly to open the ports 608, 600 and thereby admit pressure fluid into the cylinder 228 to cause downward movement to be imparted to the member 204 to tip the leveling roll in a clockwise direction about the axis of the shaft 220. As previously pointed out, the member 204 is connected to the roll carrier 218 through the segment gear 208, rock shaft 210, lever 212, and adjustable link 214, and, as the lever 212 is swung in either direction by the movement of the member 204 it tends to swing the lever 632 about its pivotal connection to the links 630 in a direction to return the valve member 612 to the position shown in Fig. 3 and thus to stop the tipping movement of the roll 24 unless the operator is at the same time moving the hand lever 616 in a direction to counteract this tendency to close the valve 612. It will thus be evident that by means of the hand lever 616 the operator may cause the roll 24 to be tipped laterally of the shoe in either direction at any desired inclination in operating on any portion of the shoe bottom. It will also be evident that the roll may be tipped at different rates of speed depending upon how fast the hand lever 616 is swung by the operator to open the ports 598, 600. In order to limit the extent to which the valve 612 may be moved to open either the port 598 or the port 600 and thus to determine the maximum speed at which the roll may be tipped in either direction, there is threaded into the cap piece 638 an adjustable rod 658 having formed thereon a collar 660 which limits downward movement of the valve 612 to open the port 598 by engagement with an arm 662 on the head 634 of the rod 636. The rod 658 extends upwardly through an opening in the projection 662, and threaded on the upper end of the rod is a nut and lock nut 664 that limits upward movement of the valve 612 to open the port 600. If the rate of speed of the hand lever 616 is accelerated fast enough in either direction to move the arm 662 into engagement with one or the other of the stops 660, 664, the roll will be tipped at the maximum rate of speed. It will be evident also that in the event of an abnormal acceleration in the speed of movement of the hand lever in either direction, engagement of the arm 662 with one or the other of said stops will retard further movement of the hand lever.

Figure 12:
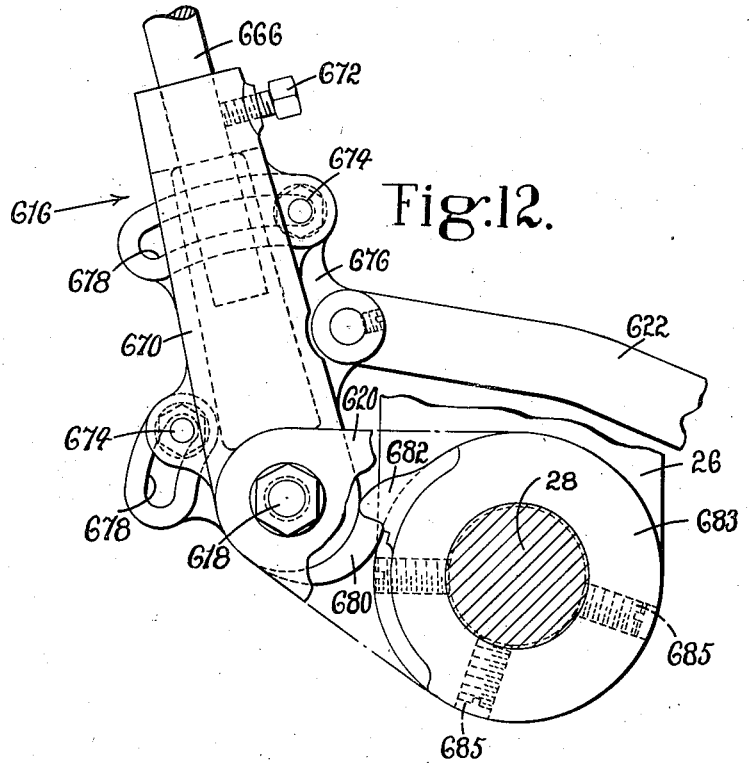
Fig. 12 is an enlarged detail view in side elevation of the hand lever and associated parts for controlling the tipping movement of the leveling tool.

Conveniently, the hand lever 616 is so formed that it may be adjusted heightwise and lengthwise of the machine within limits to suit the convenience of the operator. As shown, the hand lever comprises a rod 666 (Fig. 1) on the upper end of which is a knob 668 arranged to be grasped by the hand of the operator. The rod is adjustably movable in a casting 670 pivoted at 618 to the boss 620 so that its effective length may be varied, a set screw 672 being provided for holding it in adjusted position (Fig. 12). The casting 670 is secured by bolts 674 to a plate 676 also fulcrumed at 618 to the boss 620 and to which the link 622 is pivotally connected. The body portions of the bolts extend through arcuate slots 678 in the plate 676 concentric with the axis 618 so that upon loosening the bolts 674 the casting 670 and the rod 666 may be adjusted relatively to the plate 676 to vary the position of the knob 668 forwardly or rearwardly in the machine, as desired. When the machine is initially at rest with the jack 22 in its forwardly inclined position (Fig. 1), the valve member 612 is in the position shown in Fig. 3 with the leveling roll 24 in a substantially horizontal position. In order to prevent any accidental opening of the valve member 612, such as might be caused by forward swinging movement of the hand lever 616 due to the weight of parts, there is formed on the plate 676 a projection 680 arranged to engage a projection 682 formed on a collar 683 adjustably secured by screws 685 to the rockshaft 28. It will be understood that, as the jack 22 is swung rearwardly to carry the toe end of the shoe into position beneath the leveling roll 24, the rocking of the shaft 28 moves the projection 682 relatively to the projection 680 so that thereafter the hand lever 616 may be swung either forwardly or rearwardly to cause the leveling roll to be tipped as desired.

From the foregoing description, it will be evident that the operator by movement of the hand levers 274 and 616 may control the direction and extent of swinging movement imparted to the jack 22 and of tipping movement imparted to the roll 24 exactly as if he were operating the machine by hand, the speed of movement of the hand levers being preferably slow enough to permit the operator to stop the swinging movement of the jack or the tipping movement of the roll at any desired point merely by stopping the movement of the appropriate hand lever. As previously pointed out, as the jack 22 receives its first rearward swinging movement to carry the toe end of the shoe under the leveling roll 24, the rod 372 is moved forwardly by its operating spring 378 to straighten the toggle links 384, 386 and thus to increase the tension of the spring 338 of the pressure controlling valve, so that the operating fluid is thereafter supplied under the desired maximum pressure. As the pressure of the operating fluid is thus increased the pistons 516 and 500 are moved upwardly and swing the arm 422 against the resistance of the springs 460, 462 in a direction to elevate the leveling roll. As the toe end of the shoe is moved into position beneath the leveling roll, the lever 554 is swung downwardly by engagement of the adjustable block 574 on the forwardly moving rod 372 with the block 576 pivotally connected to the arm 578 of the lever 554. This movement of the lever 554 acts to move the valve 528 into position to close the port 541 and to open the port 534, thus permitting the springs 460, 462 to swing the lever 442 reversely to lower the leveling roll into engagement with the shoe bottom. It will be understood that by adjustment of the block 574 on the rod 372 the time in the rearward swinging movement of the jack 22 when the leveling roll is thus released to the action of its operating springs 460, 462 may be varied to cause the roll to engage the toe end of the sole at any desired point, the block 574 being preferably so adjusted that the roll will move downwardly into engagement with the sole at its toe end just rearwardly of its projecting margin. The forward movement of the rod 372 is limited by the engagement of a pin 684 (Fig. 9) carried by a rearwardly extending arm 686 adjustably secured to the rock shaft 368 with an adjustable rod 688 at the upper end of a lengthwise slot 690 in the rod, the rod 688 being pivotally connected at its lower end to a treadle 692 fulcrumed at 694 to the frame 20.

The construction of the illustrated machine is further such that after the jack 22 has received its first rearward swinging movement to carry the toe end of the shoe under the leveling roll 24, the hand lever 274 is locked against forward swinging movement from the position it assumed when the jack 22 has been swung rearwardly far enough to carry the toe end of the shoe under the leveling roll. As shown particularly in Fig. 10, the hand lever 274 comprises a rod 696 slidably mounted in a casting 698 fulcrumed at 276 to the boss 277, the rod having formed on its upper end a knob (not shown) arranged to be grasped by the hand of the operator. Also fulcrumed at 276 to the boss 277 is a plate 700 provided with arcuate slots 702 concentric with the axis 276 and through which extend the body portions of bolts 704 carried by the casting 698, the casting 698 and the plate 700 being thus relatively adjustable to vary the position of the rod 696 lengthwise of the machine. It will be understood that the link 278 is pivotally connected to the plate 700 of the hand lever. Formed on the plate 700 is a downwardly extending arm 706 to which there is pivotally connected a bell crank lever 708 between one arm 710 of which and a pin 712 projecting from the plate 700 there extends a spring 714 that tends to swing the bell crank lever in a direction to hold its second arm 716 in engagement with a fixed stop, illustrated as a pin 718 projecting from the frame 20. The arm 710 of the bell crank lever carries a pin 720 arranged to extend into a lengthwise slot 722 formed in a link 724 pivotally connected at its upper end to a collar 726 adjustably secured to the rod 696. The casting 698 is counterbored to receive a spring 728 that surrounds the rod 696 and bears at its upper end against the collar 726, the spring thus acting to hold the collar in engagement with the head of a pin 730 carried by the casting 698. The construction is such that as the hand lever 274 is swung rearwardly to cause rearward swinging movement to be imparted to the jack 22 from the position shown in Fig. 10 to carry the toe of the shoe under the leveling roll 24, the bell crank lever 708 is moved bodily about the axis 276 and is also swung by the spring 714 in a direction to move the pin 720 into engagement with the link 724 at the upper end of the slot 722 with the pin 718 engaging the arm 716 in a notch 732 formed in the lower end of the arm. The hand lever is thus effectively locked against forward swinging movement, the spring 714 maintaining the parts in the above-described relation during further rearward swinging movements of the hand lever so that each time in its forward swinging movement the arm 716 will, by engagement with the stop 718, limit the forward swinging movement of the jack when the extreme toe end of the sole has been moved into the desired relation to the leveling roll. The collar 726 is provided with a split bearing for the rod 696, the two halves of the split bearing being connected together by a binding screw 734 tightening of which draws the two halves of the split bearing toward each other to clamp the collar in adjusted position on the rod. It will be readily seen that by loosening the binding screw the rod 696 may be adjusted relatively to the casting 698 in the direction of its length to vary its heightwise position to suit the convenience of the operator. At the end of the leveling operation the operator may by merely pressing downwardly on the rod 696 cause the link 724 by engagement with the pin 720 to swing the bell crank lever 708 against the resistance of the spring 714 in a direction to move the arm 716 out of engagement with the stop 718, and with the rod thus depressed the hand lever may be swung forwardly to cause forward swinging movement of the jack to its initial starting position.

The illustrated machine is further provided with automatic means for controlling the valve 270 to prevent rearward movement of the shoe support beyond a position in which the roll is in engagement with the bottom of the shoe substantially at the junction of its shank and heel end portions. For this purpose, there is loosely mounted on the rock shaft 28 an arm 736 (Fig. 10) adjustable relatively to the shaft 28 by means of a threaded rod 738 rotatably mounted in a bearing 740 pivotally connected to the heel post 30. The rod 738 is held against endwise movement relatively to the bearing 740 by a hand wheel 742 fast to the outer end of the rod and engaging one end face of the bearing 740 and a collar 744 fast to the rod and engaging the opposite end face of the bearing. The rod 738 extends through a block 746 pivotally connected to a projection 748 on the arm 736, and pinned to the rear end of the rod is a collar 750. Loosely journaled on the rock shaft 368 is a bell crank lever 752 (Fig. 11) having an upwardly extending arm 754 carrying at its upper end a roll 756 and a rearwardly extending arm 758 (Fig. 10) connected by an adjustable rod 760 to the forward end of an arm 762 (Fig. 15) fulcrumed at 284 to the frame 20 and connected by an upwardly extending link 764 to the head 292 of the rod 294. The roll 756 lies in the path of movement of the lower end of the arm 736 so that in the rearward movement of the jack 22, when the roll is engaged by the arm, the bell crank lever 752 is swung in a counterclockwise direction, as viewed in Fig. 9. As the bell crank lever 762 is thus swung it acts through the rod 760 to swing the arm 762 in the direction to raise the rod 294 and the valve member 270 to close the port 250, thus disconnecting the source of pressure fluid from the member 180 and stopping the rearward swinging movement of the jack. It will be evident that by adjustment of the arm 736 about the shaft 28 by means of the threaded rod 738 the time in the rearward movement of the jack, when the roll 756 is engaged by the arm, may be varied to vary the limit of rearward swinging movement of the jack, the arm 736 preferably being so adjusted that the roll will be engaged by the arm substantially at the time in the rearward movement of the jack when the leveling roll 24 is located substantially at the junction of the bottom of the shank and heel end portions of the shoe. It will be evident also that in adjusting the jack to accommodate shoes of different lengths movement of the heel post toward or from the toe post 26 to position the ends of the toes of shoes of different lengths in substantially the same location will vary the position of the arm 736 relatively to the roll 756 in accordance with variations in the lengths of different shoes. Accordingly, the extent of rearward swinging movement of the jack will be varied in operating upon shoes of different lengths, the jack being brought to a stop by the action of the arm 736 on the lever 752 with the leveling roll in substantialy the same relation to shoes of different lengths.

As previously pointed out, forward movement of the rod 372 is limited by engagement of the pin 684 in the arm 686 with the rod 688 at the upper end of the slot 690 in the rod. The rod 688 is pivotally connected at its lower end to the treadle 692 which is upheld by a spring 766 (Fig. 9) with an adjustable stop, illustrated as a screw 768, in engagement with the frame 20. It will be evident that at any time in the operation of the machine the operator may by depressing the treadle 692 move the rod 372 rearwardly far enough to release the lever 554 to the action of the spring 562 to cause the valve 528 to be opened and the port 534 closed. As the valve 528 is thus moved to open position, the pressure fluid acts to raise the pistons 516, 500 to cause the leveling roll to be moved upwardly out of engagement with the bottom of the shoe. If the sole is provided with a clearly defined ball line, the operator may thus cause the roll to be lifted each time in the swinging movement of the jack when the roll approaches the ball line, or, he may hold the leveling roll upraised so as not to contact with the shoe until some particular portion on the sole, such, for example, as the shank, is in position beneath the roll, if it is desired to level the shank portion without leveling the forepart. Moreover, in operating on shoes of the cottage shank type, after leveling one side of the shank with the roll in an inclined position, he may lift the roll and place it in an oppositely inclined position on the other side of the shank without engaging the central ridge of the sole. Furthermore, if the operator observes any small irregularities in the sole such as might be caused by the unevenness of the shoe materials between the outsole and the insole, he may disconnect the previously mentioned fluid check for retarding the movement of the leveling roll toward the shoe, and by depressing and releasing the treadle 692 a number of times cause the leveling roll to apply a plurality of hammer blows to the sole to assist in leveling such irregularities. It will be understood that to disconnect the fluid check all the operator need do is to adjust the screw 594 far enough to move the ball valve 592 out of engagement with its seat at the lower end of the bore 584.

With the fluid check disconnected each time, the treadle is raised to permit the rod 372 to move forwardly and to swing the lever 554 in the direction to close the valve 528 the leveling roll will be operated by the springs 460, 462 to impart a hammer blow to the sole.

In the operation of the machine briefly summarized the operator mounts a last and shoe on the heel pin 34, moves the heel post relatively to the toe post position the toe end of the shoe in proper relation to the toe support 32, and then by downward movement of the hand lever 50 locks the heel post in adjusted position and causes the heel pin to be tipped toward the toe post to force the toe end of the shoe down on the toe support. Then by rearward swinging movement of the hand lever 274 the operator causes the jack 22 to be swung rearwardly to bring the toe end of the shoe under the leveling roll 24. As the jack is thus swung, the rod 372 is moved forwardly by the spring 378 to swing the toggle links 384, 386 into substantially parallel relation, thus imparting downward movement to the plunger 334 further to compress the spring 338. As the spring 338 is thus compressed it acts to move the valve 322 into position to interrupt the flow of the operating fluid from the pump 236 to the reservoir, thus increasing the pressure of the operating fluid. As the pressure of the operating fluid is increased, the pistons 500 and 516 are moved upwardly to cause upward swinging movement to be imparted to the roll holder 418 to carry the roll into a position higher than it occupies in operating upon a shoe. In the continued forward movement of the rod 372 the lever 554 is swung by engagement of the collar 574 on the rod 372 with the block 576 carried by the arm 578 of the lever 554 against the resistance of the spring 562 in a direction to move the valve 528 into position to close port 541, and to open the port 534, thus releasing the holder 418 to the action of the springs 460, 462. The roll is accordingly swung downwardly to engage the shoe initially upon the bottom face of the toe end of the sole in such a location as to permit proper leveling of the toe portion without imparting any excessive bending to the margin of the toe end of the sole. It will be understood that by adjustment of the collar 574 on the rod 372 the time in the first rearward movement of the jack when the leveling roll is thus moved downwardly into position to engage the shoe may be varied to vary the location in which the roll first engages the shoe. It will be understood also that the movement of the valve 528 into position to close the port 541 and to open the port 534 and the downward swinging movement of the holder 418 is retarded by the fluid check to prevent any pounding action of the roll on the bottom of the shoe. In the first rearward swinging movement of the jack 22, the arm 716 of the bell crank lever 708 is engaged by the stop 718 in the notch 732 formed in the lower end of the arm, thus locking the hand lever 274 against forward swinging movement from the position it assumes when the jack has been swung rearwardly far enough to carry the toe end of the shoe under the leveling roll 24, the abutment 682 (Fig. 12) also being moved relatively to the abutment 680 on the hand lever 616 into a position in which it will no longer obstruct forward swinging movement of the hand lever 616. Thereafter the operator may by movement of the hand levers 274, 616 cause the jack to be swung rearwardly and forwardly beneath the leveling roll and may vary the extent of its swinging movements within the limits determined by engagement of the arm 716 with the stop 718 and by engagement of the arm 736 with the roll 756. With the leveling roll 24 in a horizontal position or tipped at any desired inclination, the operator may start, stop, or reverse the swinging of the jack and the tipping of the leveling roll at will and may thus readily subject each shoe to such individual treatment as he deems necessary from his observation of the shoe as the operation of the machine proceeds. By depression of the treadle 692 the operator may cause the roll to be lifted at any point in its operation on the sole or he may hold it raised until some particular portion of the sole is under the roll. If he deems it necessary, the operator may by adjustment of the screw 594 disconnect the fluid check and by repeated depressions of the treadle cause the leveling roll to impart a plurality of hammer blows to any portion of the sole to assist in leveling any irregularities that may exist in the sole. When the leveling operation has been satisfactorily completed, the rod 696 of the hand lever 672 is depressed to swing the arm 716 into a position in which it will not be engaged by the stop 718 as the hand lever is swinging forwardly to cause forward swinging movement of the jack to its initial starting position. As the jack is returned to its initial starting position, the shaft 368 is rocked, by engagement of the arm 362 with the roll 364 carried by the arm 366 in a direction to impart rearward movement to the rod 372. Rearward movement of the rod 372 first releases the lever 554 to the action of the spring 562 for upward swinging movement to move the valve 528 into position to open the port 541 and to close the port 534, thus permitting the pressure fluid to impart upward movement to the pistons 500 and 516 to cause the leveling roll to be lifted from the shoe as the toe end of the shoe is moved out from under the leveling roll, after which in the continued rearward movement of the rod the toggle links 384, 386 are swung relatively to each other into the position shown in Fig. 1 to permit upward movement of the plunger 334 to relieve the tension of the spring 338. This causes the pressure of the operating fluid to be reduced sufficiently to permit the springs 460, 462 to swing the arm 442 rearwardly to lower the leveling roll until the arm engages the adjustable screw 472. With the jack in its initial forwardly inclined position the hand lever 50 is swung upwardly to unlock the jack, and the last and shoe are removed.

Having described the invention, what we claim as new and desire to secure by Letters Patent of the United States is:

1. In a leveling machine, a shoe support, a leveling tool, power-operated means for effecting relative movement of said shoe support and the leveling tool in directions lengthwise of a shoe on said support to cause the tool to operate progressively along the shoe bottom, and controlling means for terminating said relative movement at any point in the operation of the tool on the bottom of the shoe comprising a member movable by the operator to start said relative movement and adapted by the extent of its movement to determine variably the relative positions of the support and the tool at the time when said relative movement is terminated.

2. In a leveling machine, a shoe support, a leveling tool, power-operated means for effecting relative movement of said shoe support and the leveling tool in directions lengthwise of a shoe on said support to cause the tool to operate progressively along the shoe bottom, means for starting said power-operated means in operation comprising a manually-operated member movable different distances in the same direction as determined by the operator, and automatic means cooperating with said manually-operated member to bring said power-operated means to a stop after movement of varying extent determined by the extent of the movement of said manually-operated member.

3. In a leveling machine, a shoe support, a leveling tool, power-operated means for effecting relative movement of said shoe support and the leveling tool in directions lengthwise of a shoe on said support to cause the tool to operate progressively along the shoe bottom, and controlling means comprising cooperating members, one operated manually and the other by power, to cause said power-operated means to continue its operative movement as long as movement is imparted to said manually-operated member and to bring said means to a stop when the movement of said manually-operated member is stopped.

4. In a leveling machine, a shoe support, a leveling tool, power-operated means for effecting relative movement of said shoe support and the leveling tool in directions lengthwise of a shoe on said support to cause the tool to operate progressively along the shoe bottom, controlling means comprising cooperating members, one operated manually and the other by power, to cause said power-operated means to continue its operative movement as long as movement is imparted to said manually-operated member and to bring said means to a stop when the movement of said manually-operated member is stopped, and means for limiting the movement of said manually-operated member in one direction to cause said power-operated means to come to a stop with the tool in engagement with the bottom face of the toe end of the sole.

5. In a leveling machine, a shoe support, a leveling tool, power-operated means for effecting relative movement of said shoe support and the leveling tool in directions lengthwise of a shoe on said support to cause the tool to operate progressively along the shoe bottom, controlling means comprising cooperating members, one operated manually and the other by power, to cause said power-operated means to continue its operative movement as long as movement is imparted to said manually-operated member and to bring said means to a stop when the movement of said manually-operated member is stopped, and mechanism arranged to act independently of the movement of said manually-operated member to bring said power-operated means to a stop to limit the progress of the tool toward the heel end of the shoe.

6. In a leveling machine, a shoe support, a leveling tool, power-operated means for effecting relative movement of said shoe support and the leveling tool in directions lengthwise of a shoe on said support to cause the tool to operate progressively along the shoe bottom, a manually-operated member movable to start said power-operated means in operation and adapted to be moved continuously during the operation of said power-operated means, and means cooperating with said manually-operated member to cause said power-operated means to operate at a rate of speed dependent upon the speed of the movement of said member.

7. In a leveling machine, a shoe support, a leveling roll, power-operated means for effecting relative movement of said shoe support and leveling roll in opposite directions lengthwise of a shoe on said support to cause the leveling roll to operate progressively along the shoe bottom, and means for starting said power-operated means in operation and for thereafter reversing it at any point in its operation at the will of the operator comprising a manually-operated member, and mechanism cooperating with said manually-operated member to limit variably as determined by the extent of the movements of said member in opposite directions respectively the extent of the relative movements of the shoe support and leveling roll in opposite directions.

8. In a leveling machine, a shoe support, a leveling tool, power-operated means for moving said shoe support in opposite directions lengthwise of a shoe thereon to cause the leveling tool to operate progressively along the shoe bottom, controlling mechanism for starting said power-operated means in operation and for reversing it at the will of the operator comprising a manually-operated member movable in opposite directions respectively to start and reverse said power-operated means, and means cooperating with said member to cause the shoe support to move in either direction at a rate of speed determined by the speed of the movement of said member.

9. In a leveling machine, a shoe support, a leveling tool, power-operated means for effecting relative movement of said shoe support and the leveling tool in directions lengthwise of a shoe on said support to cause the tool to operate progressively along the shoe bottom, a manually-operated member movable to start said power-operated means in operation and adapted to be moved continuously during the operation of said power-operated means, means cooperating with said manually-operated member to cause said power-operated means to operate at a rate of speed dependent upon the speed of the movement of said member, and means for limiting the speed of movement of said manually-operated member.

10. In a leveling machine, a shoe support, a leveling tool, power-operated means for moving said shoe support in opposite directions lengthwise of a shoe thereon to cause the leveling tool to operate progressively along the shoe bottom, controlling mechanism for starting said power-operated means in operation and for reversing it at the will of the operator comprising a manually-operated member movable in opposite directions respectively to start and reverse said power-operated means, means cooperating with said member to cause the shoe support to move in either direction at a rate of speed dependent upon the speed of the movement of said member, and means operative in the event of an abnormal acceleration in the speed of movement of said manually-operated member for retarding its movement.

11. In a leveling machine, a shoe support, a leveling tool, fluid-pressure means for effecting relative movement of said shoe support and the leveling tool lengthwise of a shoe on said support to cause the tool to operate progressively along the shoe bottom, valve mechanism for controlling said fluid-pressure means, and means for controlling said valve mechanism to terminate the relative movement of the support and tool at any point in the operation of the tool on the bottom of the shoe comprising a manually-operated member adapted to determine variably by the extent of its movement the relative positions of the support and tool lengthwise of the shoe.

12. In a leveling machine, a shoe support, a leveling tool, fluid pressure means for effecting relative movement of said shoe support and the leveling tool lengthwise of a shoe on said support to cause the tool to operate progressively along the shoe bottom, valve mechanism for controlling said fluid-pressure means, a manually-operated member for operating said valve mechanism to start the relative movement of the support and tool, and automatic means for controlling said valve mechanism to stop the relative movement of the support and tool after movement of varying extent depending upon the extent of the movement of said manually-operated member.

13. In a leveling machine, a shoe support, a leveling tool, fluid-pressure means for effecting relative movement of said shoe support and the tool lengthwise of a shoe on said support to cause the tool to operate progressively along the shoe bottom, valve mechanism for controlling said fluid-pressure means, power-operated means tending constantly during the relative movement of the support and tool to move said valve mechanism into position to stop said relative movement, and manually-operated means adapted by continuous movement at the will of the operator to counteract the tendency of said power-operated means to stop the relative movement of the support and tool.

14. In a leveling machine, a leveling tool, a shoe support, fluid-pressure means for effecting relative movement of said shoe support and tool lengthwise of a shoe on said support to cause the tool to operate progressively along the shoe bottom, valve mechanism for controlling said fluid-pressure means, and means for controlling said valve mechanism comprising a manually-operated member and a member operated by said fluid-pressure means cooperating to keep said fluid-pressure means in operation as long as movement is imparted to said manually-operated member and to bring the operation of said fluid-pressure means to a stop when the movement of said manually-operated member is stopped.

15. In a leveling machine, a leveling tool, a shoe support mounted for rearward and forward swinging movement beneath said leveling tool to cause the tool to operate progressively along the bottom of a shoe on said support, fluid-pressure means for imparting to said shoe support its rearward and forward swinging movements, valve mechanism for controlling said fluid-pressure means, a manually-operated member for controlling said valve mechanism adapted to be moved continuously during the swinging movement of said support, and automatic valve controlling means cooperating with said manually-operated member to cause the shoe support to be swung at a rate of speed variable in accordance with the speed of said member.

16. In a leveling machine, a leveling tool, a shoe support mounted for rearward and forward swinging movement beneath said leveling tool to cause the tool to operate progressively along the bottom of a shoe on said support, fluid-pressure means for imparting to said shoe support its rearward and forward swinging movements, valve mechanism for controlling said fluid-pressure means, a manually-operated member for controlling said valve mechanism adapted to be moved continuously during the swinging movement of said support, automatic valve-controlling means cooperating with said manually-operated member to cause the shoe support to be swung at a rate of speed variable in accordance with the speed of said member, and means for limiting the speed of movement of said manually-operated member.

17. In a leveling machine, a leveling tool, a shoe support mounted for rearward and forward swinging movements beneath said leveling tool to cause the tool to operate progressively along the bottom of a shoe on said support, fluid-pressure means for imparting to said shoe support its rearward and forward swinging movements, valve mechanism for controlling said fluid-pressure means, and means for controlling said valve mechanism comprising oppositely acting members, one operated manually and the other by said fluid-pressure means, for starting and stopping the swinging movement of the support respectively, and connections between said members and the valve mechanism constructed to keep the swinging movement of the support at a uniform rate of speed in response to simultaneous movements of said members at predetermined relative rates of speed and to vary the speed of swinging movement of the support in response to variations in the ratio between the rates of speed of said members.

18. In a leveling machine, a leveling tool, a shoe support, fluid-pressure means for imparting to said support swinging movements lengthwise of the shoe thereon to cause the leveling tool to operate progressively along the shoe bottom, a valve for controlling said fluid-pressure means, and mechanism comprising oppositely acting members one operated manually and the other by said fluid-pressure means for moving said valve respectively in opposite directions to start and stop the movement of the support.

19. In a leveling machine, a leveling tool, a shoe support, fluid-pressure means for effecting relative movement of the leveling tool and said shoe support in directions lengthwise of a shoe on said support to cause the tool to operate progressively along the shoe bottom, valve mechanisms for controlling said fluid-pressure means, and mechanism operated by said fluid-pressure means for automatically controlling said valve mechanism.

20. In a leveling machine, a leveling tool, a shoe support, fluid-pressure means for imparting to said support swinging movements lengthwise of a shoe thereon to cause said leveling tool to operate progressively along the shoe bottom, a valve for controlling said fluid-pressure means, mechanism comprising oppositely acting members, one operated manually and the other by said fluid-pressure means, for moving said valve respectively in opposite directions to start and stop the swinging movement of said support, said fluid-operated member being movable continuously at all times during the swinging movement of the support, and said manually-operated member being movable at the will of the operator to counteract the tendency of said fluid-operated member to stop the swinging movement of the support.

21. In a leveling machine, a leveling tool, a shoe support mounted for rearward and forward swinging movements beneath said leveling tool to cause the tool to operate progressively along the bottom of a shoe on said support, fluid-pressure means for imparting to said shoe support its rearward and forward swinging movements, valve mechanism for controlling said fluid-pressure means, and means for controlling said valve mechanism to start and to stop or reverse the swinging movement of said support at any point in the operation of the tool on the shoe bottom at the will of the operator comprising a manually-operated member and mechanism cooperating therewith to limit variably as determined by the extent of the movements of said member in opposite directions respectively the extent of the rearward and forward swinging movements of said support.

22. In a leveling machine, a leveling tool, a shoe support mounted for rearward and forward swinging movements beneath said leveling tool to cause the tool to operate progressively along the shoe bottom, fluid-pressure means for imparting to said shoe support its swinging movements, valve mechanism for controlling said fluid-pressure means, and means for controlling said valve mechanism to start and to stop or reverse the swinging movement of the support at any point in the operation of the tool on the bottom of the shoe at the will of the operator comprising a manually-operated member adapted to be moved continuously in a rearward or a forward direction during corresponding rearward or forward swinging movement of the support and to determine by the speed of its movement in either direction the speed of movement of the support.

23. In a leveling machine, a leveling tool, a shoe support mounted for rearward and forward swinging movements beneath said leveling tool to cause the tool to operate progressively along the bottom of a shoe on said support, fluid-pressure means for imparting to said shoe support its rearward and forward swinging movements, valve mechanism for controlling said fluid-pressure means, and means for controlling said valve mechanism comprising a manually-operated member and a member operated by said fluid-pressure means for opening and closing said valve mechanism respectively to start and stop the swinging movement of said support, and connections between said members and the valve mechanism arranged to vary the open position of the valve mechanism to vary the speed of swinging movement of the support in accordance with variations in the relative rates of speed of said members.

24. In a leveling machine, a leveling tool, a shoe support mounted for rearward and forward swinging movements beneath said leveling tool to cause the tool to operate progressively along the bottom of a shoe on said support, fluid-pressure means for imparting to said shoe support its rearward and forward swinging movements, a valve for controlling said fluid-pressure means, a manually-operated member for opening said valve to start the swinging movement of the support, a member operated by said fluid-pressure means for closing the valve to stop the swinging movement of the support, and connections between said members and the valve constructed to keep said valve open as long as movement is imparted to said manually-operated member but to close the valve in response to continued movement of said fluid-pressure-operated member when the movement of said manually-operated member is stopped.

25. In a leveling machine, a leveling tool, a shoe support mounted for rearward and forward swinging movements beneath said leveling tool to cause the tool to operate progressively along the bottom of a shoe on said support, fluid-pressure means for imparting to said shoe support its rearward and forward swinging movements, a valve for controlling said fluid-pressure means, valve-controlling means comprising oppositely acting members one operated manually and the other by said fluid-pressure means for opening and closing said valve respectively to start and stop the swinging movement of said support, connections between said members and the valve constructed to vary the open position of the valve to vary the speed of swinging movement of the support in accordance with variations in the relative rates of speed of said members, and means for adjustably limiting the opening movement of the valve.

26. In a leveling machine, a leveling tool, a shoe support mounted for rearward and forward swinging movements beneath said leveling tool to cause the tool to operate progressively along the bottom of a shoe on said support, fluid-pressure means for imparting to said shoe support its swinging movements, valve mechanism movable in opposite directions respectively to cause rearward and forward swinging movements of said support, and means automatically operative in either rearward or forward swinging movement of the support for returning said valve mechanism to a neutral position to stop said swinging movement.

27. In a leveling machine, a leveling tool, a shoe support mounted for rearward and forward swinging movements beneath said leveling tool to cause said tool to operate progressively along the bottom of a shoe on said support, fluid-pressure means for imparting to said support its rearward and forward swinging movements, valve mechanism movable in opposite directions respectively to cause rearward and forward swinging movements of said support, a lever connected to said valve mechanism for thus moving it, means automatically operative in either rearward or forward swinging movement of the support for swinging said lever in a direction to return said valve mechanism to a neutral position to stop the swinging movement of the support, and manual means enabling the operator by movement of said lever at will during rearward and forward swinging movement of said support to prevent the stopping of said swinging movement.

28. In a leveling machine, a leveling tool, a shoe support mounted for rearward and forward swinging movements beneath said leveling tool to cause the tool to operate progressively along the bottom of a shoe on said support, fluid-pressure means for imparting to said shoe support its rearward and forward swinging movements, a valve movable in opposite directions respectively to cause rearward and forward swinging movements of said support, a lever swingable by the operator for moving the valve in either of said directions, and means automatically operative in either rearward or forward swinging movement of the support for swinging said lever in a direction to return the valve to a neutral position to stop the swinging movement of the support.

29. In a leveling machine, a leveling tool, a pivoted shoe support, a fluid-operated member movable in opposite directions respectively to impart rearward and forward swinging movements to said shoe support to cause the leveling tool to operate progressively along the bottom of a shoe on the support, valve mechanism for controlling the flow of fluid to said member comprising a valve movable in opposite directions respectively to cause rearward and forward movements to be imparted to said support, and manual means for moving said valve in either direction.

30. In a leveling machine, the combination with a shoe support and a leveling tool relatively movable lengthwise of a shoe on said support to cause said tool to operate progressively along the shoe bottom, of power-operated means for tipping said leveling tool laterally of the shoe to vary the inclination of the tool relatively to the bottom of the shoe, and controlling means for stopping the tipping movement of said tool comprising a member movable by the operator and adapted to determine variably by the extent of its movement the inclined position of said tool.

31. In a leveling machine, the combination with a shoe support and a leveling roll relatively movable lengthwise of a shoe on said support to cause said roll to operate progressively along the shoe bottom, of power-operated means for tipping said leveling roll laterally of the shoe about an axis extending lengthwise of the shoe to vary the inclination of the roll relatively to the bottom of the shoe, a manually-operated member movable to start said power-operated means in operation and adapted to be moved continuously during the operation of said power-operated means, and means cooperating with said manually-operated member to cause said power-operated means to operate at a rate of speed determined by the speed of the movement of said member.

32. In a leveling machine, the combination with a shoe support and a leveling roll relatively movable lengthwise of a shoe on said support to cause the roll to operate progressively along the shoe bottom, of power-operated means for moving said roll relatively to the support about an axis extending lengthwise of the shoe to vary the inclination of the roll relatively to the bottom of the shoe, a manually-operated member movable to start said power-operated means in operation and adapted to be moved continuously during the operation of said power-operated means, and means cooperating with said manually-operated member to bring said power-operated means to a stop when the movement of said manually-operated member is stopped.

33. In a leveling machine, the combination with a shoe support and a leveling roll relatively movable lengthwise of a shoe on said support to cause the roll to operate progressively along the shoe bottom, of power-operated means for imparting to said leveling roll tipping movements in opposite directions laterally of the shoe, and means for starting said power-operated means in operation and for thereafter reversing it at any point in its operation at the will of the operator comprising a manually-operated member and mechanism cooperating with said manually-operated member to limit variably as determined by the extent of the movements of said member in opposite directions respectively the extent of tipping movements imparted to said leveling roll in opposite directions.

34. In a leveling machine, a shoe support, a leveling tool, power-operated means for effecting relative movement of said shoe support and the leveling tool in directions lengthwise of a shoe on said support to cause the tool to operate progressively along the shoe bottom, power-operated means for imparting to said leveling roll tipping movements laterally of the shoe to vary the inclination of the roll relatively to the bottom of the shoe, means for starting said power-operated means in operation comprising manually-operated members movable different distances as determined by the operator, and automatic means cooperating with each of said manually-operated members to bring its associated power-operated means to a stop after movement of varying extent determined by the extent of the movement of said member.

35. In a leveling machine, a shoe support, a leveling tool, fluid-operated mechanism for swinging said shoe support in opposite directions lengthwise of a shoe thereon to cause said leveling tool to operate progressively along the shoe bottom, fluid-operated mechanism for tipping said leveling tool laterally of the shoe to vary its inclination relatively to the bottom of the shoe, valve means for controlling said fluid-operated mechanisms, and means for controlling said valve means enabling the operator to start, stop or reverse the swinging of the shoe support or the tipping of the leveling tool at will.

36. In a leveling machine, the combination with a shoe support and a leveling roll relatively movable lengthwise of a shoe on said support to cause said roll to operate progressively along the shoe bottom, of power-operated means for tipping said leveling roll laterally of the shoe about an axis extending lengthwise of the shoe to vary the inclination of the roll relatively to the bottom of the shoe, means for starting said power-operated means in operation comprising a manually-operated member movable different distances in the same direction as determined by the operator, and automatic means cooperating with said manually-operated member to bring said power-operated means to a stop after movement of varying extent determined by the extent of the movement of said manually-operated member.

37. In a leveling machine, the combination with a shoe support and a leveling roll relatively movable lengthwise of a shoe on said support to cause said roll to operate progressively along the shoe bottom, of power-operated means for tipping said leveling roll in opposite directions laterally of the shoe, controlling means for starting said power-operated means in operation and for reversing it at the will of the operator comprising a manually-operated member movable in opposite directions respectively to start and reverse said power-operated means, and means cooperating with said member to cause the roll to be tipped in either direction laterally of the shoe at a rate of speed determined by the speed of the movement of said member.

38. In a leveling machine, the combination with a shoe support and a leveling roll relatively movable lengthwise of a shoe on said support to cause the roll to operate progressively along the shoe bottom, of power-operated means for tipping said leveling roll in opposite directions laterally of the shoe, controlling means for starting said power-operated means in operation and for reversing it at the will of the operator comprising a manually-operated member movable in opposite directions respectively to start and reverse said power-operated means, means cooperating with said member to cause the roll to be tipped in either direction laterally of the shoe at a rate of speed determined by the speed of the movement of said member, and means operative in the event of an abnormal acceleration of the speed of movement of said manually-operated member for retarding its movement.

39. In a leveling machine, the combination with a shoe support and a leveling roll relatively movable lengthwise of a shoe on said support to cause said roll to operate progressively along the shoe bottom, of fluid-pressure means for tipping the leveling roll laterally of the shoe, valve mechanism for controlling said fluid-pressure means, and means for controlling said valve mechanism to stop the tipping movement of the roll with the roll at any desired inclination relatively to the bottom of the shoe comprising a manually-operated member adapted to determine variably by the extent of its movement the extent of tipping movement imparted to said roll.

40. In a leveling machine, the combination with a shoe support and a leveling roll relatively movable lengthwise of a shoe on said support to cause said roll to operate progressively along the shoe bottom, of fluid-pressure means for tipping said leveling roll laterally of the shoe about an axis extending lengthwise of the shoe to vary the inclination of the roll relatively to the bottom of the shoe, valve mechanism for controlling said fluid-pressure means, a manually-operated member for operating said valve mechanism to start the tipping movement of the roll, and automatic means for controlling said valve mechanism to stop the tipping movement of the roll after movement of varying extent depending upon the extent of the movement of said manually-operated member.

41. In a leveling machine, the combination with a shoe support and a leveling roll relatively movable lengthwise of a shoe on said support to cause said roll to operate progressively along the shoe bottom, of fluid-pressure means for tipping said leveling roll laterally of the shoe about an axis extending lengthwise of the shoe to vary the inclination of the roll relatively to the bottom of the shoe, valve mechanism for controlling said fluid-pressure means, power-operated means tending constantly during the tipping movement of said roll to move said valve mechanism into position to stop said tipping movement, and manually-operated means adapted by continuous movement at the will of the operator to counteract the tendency of said power-operated means to stop tipping movement of the roll.

42. In a leveling machine, the combination with a shoe support and a leveling roll relatively movable lengthwise of a shoe on said support to cause said roll to operate progressively along the shoe bottom, of fluid-pressure means for tipping said leveling roll laterally of the shoe about an axis extending lengthwise of the shoe to vary the inclination of the roll relatively to the bottom of the shoe, valve mechanism controlling said fluid-pressure means, and means for controlling said valve mechanism comprising a manually-operated member and a member operated by said fluid-pressure means cooperating to keep said fluid-pressure means in operation as long as movement is imparted to said manually-operated member and to bring the operation of said fluid-pressure means to a stop when the movement of said manually-operated member is stopped.

43. In a leveling machine, the combination with a shoe support and a leveling roll relatively movable lengthwise of a shoe on said support to cause said roll to operate progressively along the shoe bottom, of fluid-pressure means for tipping said leveling roll laterally of the shoe about an axis extending lengthwise of the shoe to vary the inclination of the roll relatively to the bottom of the shoe, valve mechanism for controlling said fluid-pressure means, a manually-operated member for controlling said valve mechanism adapted to be moved continuously during the tipping movement of said roll, and automatic valve-controlling means cooperating with said manually-operated member to cause the roll to be tipped at a rate of speed variable in accordance with the speed of said member.

44. In a leveling machine, the combination with a shoe support and a leveling roll relatively movable lengthwise of a shoe on said support to cause the roll to operate progressively along the shoe bottom, of fluid-pressure means for tipping said leveling roll laterally of the shoe about an axis extending lengthwise of the shoe to vary the inclination of the roll relatively to the bottom of the shoe, valve mechanism for controlling said fluid-pressure means, a manually-operated member for controlling said valve mechanism adapted to be moved continuously during the tipping movement of said roll, automatic valve controlling means cooperating with said manually-operated member to cause the roll to be tipped at a rate of speed variable in accordance with the speed of said member, and means for limiting the speed of movement of said manually-operated member.

45. In a leveling machine, the combination with a shoe support and a leveling roll relatively movable lengthwise of a shoe on said support to cause said roll to operate progressively along the shoe bottom, of fluid-pressure means for tipping said leveling roll laterally of the shoe about an axis extending lengthwise of the shoe to vary the inclination of the roll relatively to the bottom of the shoe, a valve for controlling said fluid-pressure means, and mechanism comprising oppositely acting members one operated manually and the other by said fluid-pressure means for moving said valve respectively in opposite directions to start and stop said tipping movement.

46. In a leveling machine, a shoe support, a leveling tool, means for moving said shoe support in directions lengthwise of a shoe thereon to cause said leveling tool to operate progressively along the shoe bottom, and mechanism for imparting to said leveling tool substantially at the beginning of the operation of the machine a movement heightwise of the shoe into a position higher than it occupies in operating upon the shoe and then downwardly into engagement with the toe end of the shoe bottom prior to the operation of the tool upon the shoe.

47. In a leveling machine, a shoe support, a leveling tool, power-operated means for moving said shoe support in directions lengthwise of a shoe thereon to cause the leveling tool to operate progressively along the shoe bottom, spring means for pressing the leveling tool upon the bottom of the shoe, and power-operated means for moving the leveling tool against the resistance of said spring means heightwise of the shoe into an elevated position substantially at the beginning of the operation of the machine and for then releasing it to the action of said spring means for downward movement into engagement with the toe end of the shoe bottom in predetermined time relation to the movement of the support prior to the operation of the tool upon the shoe.

48. In a leveling machine, a shoe support constructed to receive a shoe with its toe end pointing rearwardly, a leveling tool, power-operated means for moving said shoe support in directions lengthwise of a shoe thereon to cause the leveling tool to operate progressively along the shoe bottom, spring means for pressing said leveling tool upon the bottom of the shoe, and means operative in response to the movement of the shoe support for lifting the leveling tool against the resistance of said spring means into a position such as to prevent interference between the tool and the edge of the toe end of the sole of the shoe and for then releasing the tool to the action of said spring means for movement into initial engagement with the bottom of the toe end of the sole.

49. In a leveling machine, a shoe support constructed to receive the shoe bottom upward with its toe end pointing rearwardly, a leveling roll, power-operated means continuously under control of the operator for imparting to said shoe support first a rearward movement and thereafter movements in opposite directions at the will of the operator to cause the roll to operate progressively along the shoe bottom, and automatic means for lifting said roll substantially at the beginning of the operation of the machine and for releasing it for downward movement into initial engagement with the bottom of the shoe at a predetermined time in the first rearward movement of said support.

50. In a leveling machine, a shoe support constructed to receive a shoe bottom upward with its toe end pointing rearwardly, a leveling roll, power-operated means continuously under control of the operator for moving said shoe support first rearwardly and thereafter in directions lengthwise of the shoe at the will of the operator to cause the leveling roll to operate progressively along the shoe bottom, a holder for said roll movable heightwise of the shoe, and mechanism automatically operative in predetermined time relation to the first rearward movement of the shoe support for moving the holder first upwardly and then downwardly to carry the roll into initial engagement with the bottom of the toe end of the sole of the shoe.

51. In a leveling machine, a leveling tool, a shoe support constructed to receive a shoe bottom upward with its toe end pointing rearwardly, said shoe support and leveling tool being relatively movable in directions lengthwise of the shoe to cause the leveling tool to operate progressively along the shoe bottom, and fluid-pressure means for lifting the leveling tool substantially at the beginning of the operation of the machine and for releasing it for downward movement into initial engagement with the bottom of the toe end of the sole of the shoe.

52. In a leveling machine, a leveling tool, a shoe support mounted for swinging movements in directions lengthwise of a shoe thereon to cause the leveling tool to operate progressively along the shoe bottom, and fluid-pressure means controlled by the movement of said shoe support for lifting the leveling tool and then releasing it for downward movement into engagement with the toe end of the shoe bottom prior to the operation of the tool on the shoe.

53. In a leveling machine, a shoe support, a leveling tool, fluid-pressure means for effecting relative movement of said shoe support and leveling tool in directions lengthwise of a shoe thereon to cause the leveling tool to operate progressively along the shoe bottom, and mechanism operated by the pressure fluid for effecting relative movement of the leveling tool and the shoe support heightwise of the shoe to position the tool over the toe end of the shoe bottom prior to the operation of the tool upon the shoe.

54. In a leveling machine, a shoe support, a leveling tool, fluid-pressure means for moving said shoe support in directions lengthwise of a shoe thereon to cause the leveling tool to operate progressively along the shoe bottom, and mechanism operated by the pressure fluid for moving said leveling tool into an elevated position substantially at the beginning of the operation of the machine and for releasing it for movement downwardly into engagement with the toe end of the shoe bottom prior to the operation of the tool upon the shoe.

55. In a leveling machine, a shoe support, a leveling tool, fluid-pressure means for moving said shoe support in directions lengthwise of a shoe thereon to cause said leveling tool to operate progressively along the shoe bottom, spring means for pressing said leveling tool upon the bottom of the shoe, and mechanism operated by the pressure fluid for moving said leveling tool heightwise of the shoe against the resistance of said spring means into an elevated position substantially at the beginning of the operation of the machine and for releasing it to the action of said spring means for movement into engagement with the toe end of the shoe bottom at a predetermined time in the movement of said shoe support prior to the operation of said tool upon the shoe.

56. In a leveling machine, a shoe support, a leveling tool, fluid-pressure means for moving said shoe support in directions lengthwise of a shoe thereon to cause said leveling tool to operate progressively along the shoe bottom, spring means for pressing said leveling tool upon the bottom of the shoe, said spring means being arranged to maintain said tool initially in a position lower than it occupies in operating upon the shoe, mechanism operated by the pressure fluid for lifting said tool against the resistance of said spring means into a position spaced higher than the bottom of the shoe substantially at the beginning of the operation of the machine, and means for disconnecting said mechanism from the source of pressure fluid to release the tool to the action of said spring means at a predetermined time in the movement of said support prior to the operation of the tool upon the shoe.

57. In a leveling machine, a shoe support constructed to receive a shoe with its toe and pointing rearwardly, a leveling tool, fluid-pressure means continuously under control of the operator for moving said shoe support first rearwardly and thereafter forwardly and rearwardly at the will of the operator to cause the leveling tool to operate progressively along the shoe bottom, spring means for pressing said leveling tool upon the bottom of the shoe, and mechanism operated by the pressure fluid for imparting to said leveling tool against the resistance of said spring means a movement heightwise of the shoe into a position higher than it occupies in operating upon the shoe and for releasing the tool to the action of said spring means for movement downwardly into engagement with the toe end of the sole at a predetermined time in the first rearward movement of the support prior to the operation of the tool upon the shoe.

58. In a leveling machine, a shoe support constructed to receive a shoe bottom upward with its toe end pointing rearwardly, a leveling roll, power-operated means continuously under the control of the operator for moving said shoe support first rearwardly and thereafter in directions lengthwise of the shoe at the will of the operator to cause the leveling roll to operate progressively along the shoe bottom, a holder for said leveling roll movable heightwise of the shoe, spring means for moving said holder downwardly to press the roll upon the shoe bottom, fluid-pressure mechanism arranged to be actuated substantially at the beginning of the operation of the machine for raising said holder against the resistance of said spring means to prevent engagement of the roll with the edge of the toe end of the sole of the shoe, and means for disconnecting said fluid-pressure mechanism from the source of pressure fluid at a predetermined time in the first rearward movement of said support.

59. In a leveling machine, a shoe support, a leveling roll, fluid-pressure means continuously under control of the operator for moving said shoe support first rearwardly and thereafter forwardly and rearwardly at the will of the operator to cause the roll to operate progressively along the shoe bottom, mechanism for moving said roll into and out of contact with the shoe, and automatic means for controlling said mechanism in predetermined time relation to the movements of the shoe support to cause the roll to engage the shoe initially on the bottom face of the toe end of the sole in the first rearward movement of the support and to be withdrawn from the same location on the shoe in the final forward movement of the support.

60. In a leveling machine, a shoe support constructed to receive a shoe bottom upward with its toe end pointing rearwardly, a leveling roll, fluid-pressure means continuously under control of the operator for imparting to said shoe support first a rearward movement and thereafter movements in opposite directions at the will of the operator to cause the roll to operate progressively along the shoe bottom, and automatic means constructed and arranged to impart to the roll movements heightwise of the shoe to carry the roll from an initial position lower than it occupies in operating upon the shoe into engagement with the bottom of the toe end of the sole in the first rearward movement of the support and for lifting the roll when the shoe support in its forward movement arrives in a position in which the roll is in engagement with the toe end of the sole.

61. In a leveling machine, a shoe support, a leveling tool, power-operated means for effecting relative movement of said shoe support and the leveling tool in directions lengthwise of a shoe on said support to cause the tool to operate progressively along the shoe bottom, a manually-operated member movable to start said power-operated means in operation and adapted to be moved continuously during the operation of said power-operated means, automatic means cooperating with said manually-operated member to bring said power-operated means to a stop after movement of varying extent determined by the extent of the movement of said manually-operated member, means for limiting the movement of said manually-operated member in one direction to cause said power-operated means to come to a stop with the tool in engagement with the bottom of the toe end of the shoe, and automatic means for thereafter lifting the tool from engagement with the shoe.

62. In a leveling machine, a shoe support adjustable to position the ends of the toes of shoes of different sizes in substantially the same location, a leveling tool, fluid-pressure means continuously under control of the operator for moving said shoe support in directions lengthwise of a shoe thereon to cause the leveling tool to operate progressively along the shoe bottom, and mechanism operated by the pressure fluid for moving the leveling tool substantially at the beginning of the operation of the machine heightwise of the shoe into a position higher than it occupies in operation upon a shoe and for releasing it for movement downwardly into position to contact each shoe initially in a location over the bottom face of the toe end of the sole.

63. In a leveling machine, a shoe support constructed to receive a shoe bottom upward with its toe end pointing rearwardly, a leveling roll, power-operated means continuously under control of the operator for moving said shoe support first rearwardly and thereafter in directions lengthwise of the shoe at the will of the operator to cause the leveling roll to operate progressively along the shoe bottom, a holder for said roll movable heightwise of the shoe, spring means for moving said holder downwardly to press the roll upon the shoe bottom, fluid-pressure means for imparting upward movement to said holder substantially at the beginning of the operation of the machine to prevent interference between the roll and the edge of the toe end of the sole, and automatic means for disconnecting said fluid-pressure means from the source of pressure fluid at a predetermined time in the first rearward movement of said shoe support.

64. In a leveling machine, a shoe support constructed to receive a shoe bottom upward with its toe end pointing rearwardly, a leveling roll, power-operated means continuously under control of the operator for moving said shoe support first rearwardly and thereafter in directions lengthwise of the shoe at the will of the operator to cause the leveling roll to operate progressively along the shoe bottom, a holder for said roll movable heightwise of the shoe, spring means for moving said holder downwardly to press the roll upon the shoe bottom, fluid-pressure means for imparting upward movement to said holder substantially at the beginning of the operation of the machine to prevent interference between the roll and the edge of the toe end of the sole, and automatic means for disconnecting said fluid-pressure means from the source of pressure fluid in time relation to the first rearward movement of the shoe support, said automatic means being adjustable to vary the time in the first rearward movement of the support when the holder and said fluid-pressure means are disconnected.

65. In a leveling machine, a shoe support, and a leveling tool relatively movable in directions lengthwise of a shoe on said support to cause the leveling tool to operate progressively along the shoe bottom, a holder for said leveling tool mounted for swinging movements heightwise of the shoe, spring means tending normally to swing said holder in a direction to press the tool down on the shoe, and fluid-pressure means for swinging said holder reversely to lift the tool from the shoe at any point in its operation on the shoe at the will of the operator.

66. In a leveling machine, a shoe support and a leveling tool relatively movable in directions lengthwise of a shoe on said support to cause the leveling tool to operate progressively along the shoe bottom, a holder for said leveling tool mounted for swinging movements heightwise of the shoe, spring means tending normally to swing said holder in a direction to press the tool down on the shoe, and fluid-pressure means for releasing said holder to the action of said spring means at any point in the relative movement of the support and tool at the will of the operator.

67. In a leveling machine, a shoe support, a leveling tool, fluid-pressure means for moving said shoe support in directions lengthwise of a shoe thereon to cause the tool to operate progressively along the shoe bottom, means comprising a spring-operated lever for pressing the tool down on the shoe bottom, mechanism arranged to be operated by the pressure fluid for swinging said lever against the resistance of its operating spring in a direction to lift the tool from the shoe, and means enabling the operator at will to connect said mechanism with the source of pressure fluid.

68. In a leveling machine, a shoe support and a leveling tool relatively movable in directions lengthwise of a shoe on said support to cause the tool to operate progressively along the shoe bottom, spring-operated means for pressing said tool down upon the shoe bottom, a device operative by pressure of fluid against it for lifting said tool from the shoe, valve mechanism for controlling the fluid, and a member movable by the operator at will to operate said valve mechanism and thereby render said fluid-operated device effective to lift said tool.

69. In a leveling machine, a shoe support and a leveling tool relatively movable in directions lengthwise of a shoe on said support to cause the tool to operate progressively along the shoe bottom, a holder movable heightwise of the shoe to press the tool upon the shoe, fluid-pressure mechanism for moving said holder in a direction to lift the tool from the shoe, and means enabling the operator at will to connect said mechanism with the source of pressure fluid.

70. In a leveling machine, a shoe support and a leveling roll relatively movable in directions lengthwise of a shoe on said support to cause the roll to operate progressively along the shoe bottom, means comprising a spring-operated lever for pressing the roll down on the shoe bottom, fluid-pressure means for swinging said lever against the resistance of its operating spring in a direction to lift said roll from the shoe, a valve for controlling said fluid-pressure means, and treadle-operated mechanism for operating said valve at will to render said fluid-pressure means effective to lift said roll.

71. In a leveling machine, a shoe support adjustable to position the ends of the toes of shoes of different sizes in substantially the same location, a leveling roll, power-operated means continuously under control of the operator for moving said shoe support in opposite directions at the will of the operator to cause the roll to operate progressively along the shoe bottom, spring means for pressing said roll upon the shoe bottom, fluid-pressure mechanism for moving said roll heightwise of the shoe into a position higher than it occupies in operating upon the shoe, a valve for controlling the flow of fluid, and automatic means for imparting to said valve in predetermined time relation to the movements of said support first a movement into position to disconnect said mechanism from the source of pressure fluid to permit said spring means to move the roll into position to engage each shoe initially in a location over the bottom of the toe end of the sole and thereafter a movement into position to connect said mechanism with the source of pressure fluid to cause the roll to be moved out of contact with the shoe when it is in the same relation to the sole.

72. In a leveling machine, a shoe support, a leveling tool, fluid-pressure means continuously under control of the operator for imparting to said support first a rearward movement and thereafter movements in opposite directions at the will of the operator to cause said leveling tool to operate progressively along the bottom of a shoe on said support, spring means for pressing the tool down on the shoe bottom, mechanism operated by the pressure fluid for lifting said tool against the resistance of said spring means substantially at the beginning of the operation of the machine, a valve for controlling the flow of fluid to and from said mechanism, and automatic means for moving said valve into position to disconnect said mechanism from the source of pressure fluid and to release the tool to the action of said spring means at a predetermined time in the first rearward movement of said support and for thereafter moving said valve into position to connect said mechanism with the source of pressure fluid to cause the tool to be lifted at a predetermined time in the final forward movement of said support.

73. In a leveling machine, a shoe support, a leveling tool, fluid-pressure means continuously under control of the operator for imparting to said support first a rearward movement and thereafter movements in opposite directions at the will of the operator to cause said leveling tool to operate progressively along the bottom of a shoe on said support, spring means for pressing the tool down on the shoe bottom, mechanism operated by the pressure fluid for lifting said tool against the resistance of said spring means substantially at the beginning of the operation of the machine, a valve for controlling the flow of fluid to and from said mechanism, automatic means for moving said valve into position to disconnect said mechanism from the source of pressure fluid and to release the tool to the action of said spring means at a predetermined time in the first rearward movement of said support and for thereafter moving said valve into position to connect said mechanism with the source of pressure fluid to cause the tool to be lifted at a predetermined time in the final forward movement of said support, and manually-operated means for controlling the movements of said valve at will.

74. In a leveling machine, a shoe support, a leveling tool, fluid-pressure means continuously under control of the operator for moving said shoe support in opposite directions lengthwise of a shoe on the support to cause the tool to operate progressively along the shoe bottom, spring means for pressing the tool down on the bottom of the shoe, mechanism operated by the pressure fluid for lifting said tool against the resistance of said spring means substantially at the beginning of the operation of the machine, a valve for controlling the flow of pressure fluid to and from said mechanism, a member movable in one direction to move said valve into position to disconnect the mechanism from the source of pressure fluid and to release the tool to the action of said spring means and movable in the opposite direction to move said valve into position to connect the mechanism with the source of pressure fluid to cause the tool to be lifted, an abutment movable with the shoe support for controlling the movements of said member, and manually-operated means for controlling the movements of said member independently of the movement of the shoe support.

75. In a leveling machine, a shoe support, a leveling tool, fluid-pressure means continuously under control of the operator for moving said shoe support in opposite directions lengthwise of a shoe on the support to cause the tool to operate progressively along the shoe bottom, spring means for pressing the tool down on the bottom of the shoe, mechanism operated by the pressure fluid for lifting said tool against the resistance of said spring means substantially at the beginning of the operation of the machine, a valve for controlling the flow of pressure fluid to and from said mechanism, a member movable in one direction to move said valve into position to disconnect the mechanism from the source of pressure fluid and to release the tool to the action of said spring means and movable in the opposite direction to move said valve into position to connect the mechanism with the source of pressure fluid to cause the tool to be lifted, an abutment movable with the shoe support for controlling the movements of said member, and treadle-operated means enabling the operator at will to control the movements of said member.

76. In a leveling machine, a leveling tool, a shoe support mounted for movement in directions lengthwise of a shoe thereon to cause the leveling tool to operate progressively along the shoe bottom, spring means for pressing said leveling tool down on the bottom of the shoe, fluid-pressure means for lifting said tool against the resistance of said spring means substantially at the beginning of the operation of the machine comprising two fluid-operated pistons, one movable in response to pressure of fluid against it from a source of supply and the other by fluid trapped between it and the first-named piston, and means for disconnecting said first-named piston from the source of pressure fluid and for releasing said trapped fluid at a predetermined time in the movement of the shoe support to permit the spring means to press the tool down upon the bottom of the shoe.

77. In a leveling machine, a leveling tool, a shoe support mounted for movement in direction lengthwise of a shoe thereon to cause the leveling tool to operate progressively along the shoe bottom, spring means for pressing said leveling tool down on the bottom of the shoe, fluid-pressure means for lifting said tool against the resistance of said spring means substantially at the beginning of the operation of the machine comprising two fluid-operated pistons, one movable in response to pressure of fluid against it from a source of supply and the other by fluid trapped between it and the first-named piston, a valve for connecting said first-named piston with the source of pressure fluid and for preventing escape of the fluid trapped between said pistons, and means for moving said valve into position to disconnect said first-named piston from the source of pressure fluid and to release said trapped fluid at a predetermined time in the movement of the shoe support to permit said spring means to press the tool down upon the bottom of the shoe.

78. In a leveling machine, a shoe support adjustable to position the ends of the toes of shoes of different sizes in substantially the same location, a leveling roll, fluid-pressure means for moving said shoe support in opposite directions lengthwise of a shoe thereon to cause the roll to operate progressively along the shoe bottom, valve mechanism for controlling said fluid-pressure means, manual means for controlling said valve mechanism to start and to stop or reverse the direction of movement of the support at will, and automatic means for controlling said valve mechanism to limit the movement of the support in one direction beyond a position in which the roll is in engagement with the bottom of the shoe in a location substantially at the junction of its shank and heel end portions.

79. In a leveling machine, a shoe support adjustable to position the ends of the toes of shoes of different sizes in substantially the same location, a leveling roll, fluid-pressure means for moving said shoe support in opposite directions lengthwise of a shoe thereon to cause the roll to operate progressively along the shoe bottom, valve mechanism for controlling said fluid-pressure means, manual means for controlling said valve mechanism to start and to stop or reverse the direction of movement of the support at will, and automatic means for controlling said valve mechanism to limit the movement of the support in one direction beyond a position in which the roll is in engagement with the bottom of the shoe in a location substantially at the junction of its shank and heel end portions, said automatic means being adjustable in response to adjustment of the shoe support to vary the extent of movement of the shoe support in that direction in accordance with variations in the lengths of shoes of different sizes.

80. In a leveling machine, a shoe support constructed to receive a shoe bottom upward with its toe pointing rearwardly, a leveling roll, fluid-operated means continuously under control of the operator for moving said shoe support first rearwardly and thereafter forwardly and rearwardly at the will of the operator to cause said roll to operate progressively along the shoe bottom, automatic means for preventing forward movement of the shoe support beyond a position in which the roll is in engagement with the bottom face of the toe end of the sole, and separate means acting automatically to prevent rearward movement of the support beyond a position in which the roll is in engagement with the sole substantially at the junction of its shank and heel end portions.

81. In a leveling machine, a leveling roll, a shoe support constructed to receive a shoe bottom upward with its toe end pointing rearwardly, said shoe support being mounted for rearward and forward swinging movements beneath said leveling roll to cause the roll to operate progressively along the shoe bottom, fluid-pressure means for imparting to said support its swinging movements, valve mechanism for controlling said fluid-pressure means, manual means for controlling said valve mechanism to start and to stop or reverse the swinging movement of the support at any point in the operation of the roll on the bottom of the shoe at the will of the operator comprising a hand lever adapted to be swung continuously in a rearward or a forward direction during corresponding rearward or forward swinging movements of the support and to determine by the extent of its movement in either direction the extent of movement of the support in either direction, means for preventing forward movement of the hand lever beyond the position it assumes when the roll is in engagement with the bottom face of the toe end of the sole, and automatic means for controlling said valve mechanism to prevent rearward movement of the support beyond a position in which the roll is in engagement with the bottom of the shoe substantially at the junction of its shank and heel end portions.

82. In a leveling machine, a shoe support and a leveling tool relatively movable in directions lengthwise of a shoe on said support to cause the tool to operate progressively along the shoe bottom, spring means for pressing said tool down on the shoe, means for moving said tool against the resistance of said spring means heightwise of the shoe into an elevated position and for releasing it to the action of said spring means for movement toward the shoe into engagement with its bottom face prior to the operation of the tool on the shoe, and means for retarding the movement of the tool toward the shoe.

83. In a leveling machine, a shoe support and a leveling roll relatively movable in directions lengthwise of a shoe on said support to cause the roll to operate progressively along the shoe bottom, a holder for said roll mounted for swinging movements heightwise of the shoe, spring means tending normally to swing said holder downwardly to press the roll upon the shoe bottom, a fluid-operated member for swinging said holder reversely to lift the roll, a valve means for controlling the flow of the fluid to said member, said valve means being movable into position to disconnect said member from the source of pressure fluid and to provide an outlet for the exhaust of the fluid from said member to permit downward swinging movement of the holder by said spring means, and a fluid check for retarding such movement of said valve and thereby retarding the downward swinging movement of the holder.

84. In a leveling machine, a shoe support and a leveling roll relatively movable in directions lengthwise of a shoe on said support to cause the roll to operate progressively along the shoe bottom, a holder for said roll mounted for swinging movements heightwise of the shoe, spring means tending normally to swing said holder downwardly to press the roll upon the shoe bottom, a fluid-operated piston for swinging said holder reversely to lift the roll, a cylinder in which said piston is slidably mounted, an outlet through which the fluid may exhaust from said cylinder, a valve arranged normally to close said outlet but movable to open the outlet for the exhaust of the fluid to permit downward swinging movement of the holder by said spring means, and a fluid check for retarding the movement of said valve to open said outlet and thereby retarding the downward swinging movement of the holder.

85. In a leveling machine, a shoe support and a leveling roll relatively movable in directions lengthwise of a shoe on said support to cause the roll to operate progressively along the shoe bottom, a holder for said roll mounted for swinging movements heightwise of the shoe, spring means tending normally to swing said holder downwardly to press the roll upon the shoe bottom, a fluid-operated member for swinging said holder reversely to lift the roll, a valve for controlling the flow of the fluid to said member, a lever swingable to move said valve into position to disconnect said member from the source of pressure fluid and to provide an outlet for the exhaust of the fluid from said member to permit downward swinging movement of the holder by said spring means, a fluid-containing device for retarding such movement of said lever and thereby retarding the downward swinging movement of the holder, a valve controlling the flow of fluid from said device and so arranged that pressure of the fluid thereon tends to close the valve, and means for holding said valve in a position affording a restricted opening for flow of the fluid from said device.

86. In a leveling machine, a shoe support and a leveling roll relatively movable in directions lengthwise of a shoe on said support to cause the roll to operate progressively along the shoe bottom, a holder for said roll mounted for swinging movements heightwise of the shoe, spring means tending normally to swing said holder downwardly to press the roll upon the shoe bottom, a fluid-operated member for swinging said holder reversely to lift the roll, a valve for controlling the flow of the fluid to and from said member, means enabling the operator at will to move said valve into position to disconnect said member and the source of pressure fluid, an outlet for the exhaust of the fluid from said member arranged to be opened by such movement of said valve to cause the holder to be released to the action of said spring means, a fluid-containing device for retarding the movement of said valve to open said outlet to prevent a sudden release of the holder to the action of said spring means, a ball valve in said device for controlling the flow of fluid therefrom, said ball valve being so arranged that pressure of the fluid thereon tends to close it, and a member for holding said valve in a position affording a restricted opening for the flow of the fluid.

87. In a leveling machine, a shoe support and a leveling roll relatively movable in directions lengthwise of a shoe on said support to cause the roll to operate progressively along the shoe bottom, a holder for said roll mounted for swinging movements heightwise of the shoe, spring means tending normally to swing said holder downwardly to press the roll upon the shoe bottom, a fluid-operated member for swinging said holder reversely to lift the roll, a valve for controlling the flow of the fluid to said member, means enabling the operator at will to move said valve into position to disconnect said member and the source of pressure fluid, an outlet for exhaust of the fluid from said member arranged to be opened by such movement of said valve to cause the holder to be released to the action of said spring means, a fluid-containing device for retarding the movement of said valve to open said outlet to prevent a sudden release of the holder to the action of said spring means, a ball valve in said device for controlling the flow of fluid therefrom, said ball valve being so arranged that pressure of the fluid thereon tends to close it, and a member for holding said valve in a position affording a restricted opening for the flow of the fluid, said member being adjustable to displace the valve to permit a wider opening for the flow of the fluid to lessen the retarding action of said device.

88. In a power-operated machine, a support movable to present work in position to be operated upon, a tool for thereafter operating upon the work, mechanism arranged to be operated by pressure of fluid against it for effecting such movement of the support, and means for increasing the pressure of the operating fluid as the work support is thus moved to present the work in position to be operated upon.

89. In a power-operated machine, a tool for operating upon work, a support movable toward said tool to present work for the operation of the tool, said support being further movable to cause the tool to operate upon the work, mechanism arranged to be operated by pressure of fluid against it for effecting such movements of the support, and means for increasing the pressure of the operating fluid in response to the work-presenting movement of said support.

90. In a power-operated machine, a tool for operating upon work, a work support, mechanism arranged to be operated by pressure of fluid against it for effecting relative movement of said work support and the tool prior to the engagement of the tool with the work and for thereafter effecting further relative movement of the work support and the tool to cause the tool to apply pressure to the work, and automatic means for increasing the pressure of the operating fluid at a predetermined time in the relative movement of the work support and the tool and prior to the engagement of the tool with the work to provide sufficient pressure for the operation of the tool upon the work.

91. In a power-operated machine, a tool for operating upon work, a work support, fluid pressure mechanism for effecting relative movement of said work support and the tool prior to the engagement of the tool with the work and for thereafter effecting further relative movement of the work support and the tool to cause the tool to apply pressure to the work, a pump for supplying fluid to said mechanism, a valve arranged to be held normally in open position by pressure of fluid delivered by said pump, valve-controlling means for yieldingly resisting such opening of the valve to cause the fluid to be maintained initially under pressure between the pump and said mechanism, and automatic means for increasing the resistance of said valve-controlling means to increase the pressure of the operating fluid at a predetermined time in the relative movement of the work support and the tool prior to the engagement of the tool with the work.

92. In a leveling machine, a shoe support movable to carry a shoe mounted thereon into position to be operated upon, a leveling tool for thereafter operating upon the shoe, mechanism arranged to be operated by pressure of fluid against it for effecting such movement of the shoe support, and means for increasing the pressure of the operating fluid as the shoe support is thus moved.

93. In a leveling machine, a leveling tool, a shoe support movable toward said leveling tool to carry a shoe mounted thereon into position to be operated upon by said tool, said support being further movable to cause the tool to apply pressure to the shoe, mechanism arranged to be operated by pressure of fluid against it for effecting such movements of the shoe support, and means for increasing the pressure of the operating fluid in response to the movement of the support to carry the shoe into position to be operated upon.

94. In a leveling machine, a leveling tool, a shoe support, mechanism arranged to be operated by pressure of fluid against it for effecting relative movement of said shoe support and the leveling tool prior to the operation of the tool upon the shoe and for thereafter effecting further relative movement of the shoe support and the leveling tool to cause the tool to operate progressively along the shoe bottom, and automatic means for increasing the pressure of the operating fluid at a predetermined time in the relative movement of the work support and the tool prior to the operation of the tool upon the shoe.

95. In a leveling machine, a shoe support, a leveling tool, fluid-pressure mechanism for imparting to said shoe support first a rearward swinging movement to carry a shoe on the support into position to be engaged by said leveling tool and thereafter swinging movements in opposite directions lengthwise of the shoe to cause the leveling tool to operate progressively along the shoe bottom, a pump for supplying fluid to said mechanism, a valve arranged to be held normally in open position by pressure of fluid delivered by said pump, valve-controlling means for yieldingly resisting such opening of the valve to cause the fluid to be maintained normally under pressure between the pump and said mechanism, and automatic means for increasing the resistance of said valve controlling means to increase the pressure of the operating fluid at a predetermined time in the first rearward swinging movement of said support prior to the operation of the leveling tool upon the shoe.

96. In a leveling machine, a leveling tool, a shoe support, fluid-pressure mechanism for effecting relative movement of said shoe support and the leveling tool prior to the operation of the tool upon the shoe and for thereafter effecting further relative movement of the shoe support and the leveling tool to cause the tool to operate progressively along the shoe bottom, a pump for supplying fluid to said mechanism, a valve arranged to be held normally in open position by pressure of fluid delivered by said pump, a spring tending to close said valve and against the resistance of which the valve is thus held open to cause the fluid to be maintained initially under pressure between the pump and said mechanism, and means for automatically increasing the resistance of said spring to increase the pressure of the operating fluid at a predetermined time in the relative movement of the work support and the tool to provide sufficient pressure for the operation of the leveling tool upon the shoe.

97. In a leveling machine, a shoe support, a leveling tool, fluid-pressure mechanism for imparting to said shoe support first a rearward swinging movement to carry a shoe on the support into position to be engaged by said leveling tool and thereafter swinging movements in opposite directions lengthwise of the shoe to cause the leveling tool to operate progressively along the shoe bottom, a pump for supplying fluid to said mechanism, a valve arranged to be held normally in open position by fluid delivered by said pump, a spring tending to close said valve and against the resistance of which the valve is thus held open to cause the fluid to be maintained under pressure between the pump and said mechanism, and a member movable to compress said spring in response to the movement of the support to cause the pressure of the operating fluid to be increased prior to the operation of the leveling tool upon the shoe.

98. In a leveling machine, a leveling tool, a shoe support, fluid-pressure mechanism for effecting relative movement of said shoe support and the leveling tool prior to the operation of the tool upon the shoe and for thereafter effecting further relative movement of the shoe support and the leveling tool to cause the tool to operate progressively along the shoe bottom, a pump for supplying fluid to said mechanism, a valve arranged to be held normally in open position by pressure of fluid delivered by said pump, a spring tending to close said valve and against the resistance of which the valve is thus held open to cause the fluid to be maintained under pressure between the pump and said mechanism, an adjustable member for determining the initial resistance of said spring, and means for imparting to said member a movement in the direction to increase the resistance of said spring to increase the pressure of the operating fluid at a predetermined time in the relative movement of the work support and the leveling tool prior to the operation of the leveling tool on the shoe.

99. In a leveling machine, a shoe support, a leveling tool, fluid-pressure mechanism for imparting to said shoe support first a rearward swinging movement to carry a shoe on the support into position to be engaged by said leveling tool and thereafter swinging movements in opposite directions lengthwise of the shoe to cause the leveling tool to operate progressively along the shoe bottom and then a final forward swinging movement after the completion of the leveling operation, a pump for supplying fluid to said mechanism, a valve arranged to be held normally in open position by fluid delivered by said pump, a spring tending to close said valve, an abutment between which and the valve said spring is arranged to be compressed in response to the opening of the valve to cause the fluid to be maintained under pressure between the pump and said mechanism, and means controlled by the movement of the shoe support for imparting to said abutment a movement in the direction further to compress said spring to increase the pressure of the operating fluid at a predetermined time in the first rearward swinging movement of the support substantially at the beginning of the operation of the leveling tool upon the shoe and thereafter a return movement to its initial position at a predetermined time in the final forward swinging movement of the support after the completion of the leveling operation.

FRED V. HART.
JOHN J. AUSTIN.

CERTIFICATE OF CORRECTION.

Patent No. 2,230,244.   February 4, 1941.

FRED V. HART, ET AL.

It is hereby certified that error appears in the printed specification of the above numbered patent requiring correction as follows: Page 3, first column, line 28, before the word "which" insert --to--; page 5, second column, line 54, for "of" before "which" read --to--; page 11, second column, line 4, after "post" insert --to--; page 17, first column, line 29, claim 45, for "length wise" read --lengthwise--; page 18, first column, line 51, claim 57, for "and" read --end--; page 20, second column, line 47-48, claim 77, for "direction" read --directions--; and that the said Letters Patent should be read with this correction therein that the same may conform to the record of the case in the Patent Office.

Signed and sealed this 11th day of March, A. D. 1941.

(Seal)

Henry Van Arsdale,
Acting Commissioner of Patents.